US008935373B2

(12) United States Patent
Sugata et al.

(10) Patent No.: US 8,935,373 B2
(45) Date of Patent: Jan. 13, 2015

(54) MANAGEMENT SYSTEM AND COMPUTER SYSTEM MANAGEMENT METHOD

(75) Inventors: Yuki Sugata, Chigasaki (JP); Takaki Kuroda, Machida (JP); Yoshihiro Hashimoto, Kanazawa (JP)

(73) Assignee: Hitachi, Ltd., Tokyo (JP)

( * ) Notice: Subject to any disclaimer, the term of this patent is extended or adjusted under 35 U.S.C. 154(b) by 319 days.

(21) Appl. No.: 12/866,880

(22) PCT Filed: Jun. 14, 2010

(86) PCT No.: PCT/JP2010/060064
§ 371 (c)(1),
(2), (4) Date: Aug. 9, 2010

(87) PCT Pub. No.: WO2011/158322
PCT Pub. Date: Dec. 22, 2011

(65) Prior Publication Data
US 2011/0307591 A1    Dec. 15, 2011

(51) Int. Cl.
G06F 15/173    (2006.01)
G06F 11/30    (2006.01)
G06F 13/00    (2006.01)

(52) U.S. Cl.
CPC ............... *G06F 11/30* (2013.01); *G06F 13/00* (2013.01)
USPC ............ 709/223; 709/230; 709/228; 709/227

(58) Field of Classification Search
USPC .................................. 709/223, 230, 228, 227
See application file for complete search history.

(56) References Cited

U.S. PATENT DOCUMENTS

| 6,138,122 | A | 10/2000 | Smith et al. |
|---|---|---|---|
| 6,405,310 | B1 | 6/2002 | Simpson |
| 6,917,288 | B2 | 7/2005 | Kimmel et al. |
| 7,254,645 | B2 * | 8/2007 | Nishi ............................ 709/249 |
| 7,346,678 | B1 * | 3/2008 | Zhu et al. ..................... 709/224 |
| 7,506,048 | B1 | 3/2009 | Motoyama |
| 2003/0033410 | A1 | 2/2003 | Kobayashi |
| 2003/0149796 | A1 * | 8/2003 | Emerson et al. .............. 709/250 |
| 2005/0204032 | A1 | 9/2005 | Mirza-Baig |
| 2005/0216578 | A1 | 9/2005 | Thompson |

(Continued)

FOREIGN PATENT DOCUMENTS

| EP | 1 631 003 | 3/2006 |
|---|---|---|
| JP | 11-327946 A | 11/1999 |

(Continued)

OTHER PUBLICATIONS

USPTO Non-final Office Action on U.S. Appl. No. 12/672,991 mailed Dec. 5, 2011; 35 pages.

(Continued)

*Primary Examiner* — Lan-Dai T Truong
(74) *Attorney, Agent, or Firm* — Foley & Lardner LLP

(57) ABSTRACT

A system management apparatus for managing a computer system receives plug-in distribution data from a plug-in distribution apparatus. The plug-in distribution data comprises plug-in definition information and template definition information. The system management apparatus uses the plug-in definition information to acquire information from the management target apparatus, and determines whether or not to issue an alert based on the template definition information. The distribution of the plug-in and the template at the same time means that the user can avoid confusion regarding the threshold setting.

40 Claims, 36 Drawing Sheets

(56) References Cited

U.S. PATENT DOCUMENTS

| | | | |
|---|---|---|---|
| 2005/0267928 A1 | 12/2005 | Anderson et al. | |
| 2006/0041928 A1 | 2/2006 | Masuoka | |
| 2006/0080429 A1 | 4/2006 | Motoyama et al. | |
| 2006/0165103 A1 | 7/2006 | Trudeau et al. | |
| 2006/0224705 A1 | 10/2006 | Takase | |
| 2007/0067430 A1 | 3/2007 | Hirata et al. | |
| 2009/0013065 A1* | 1/2009 | Nagashima | 709/223 |
| 2010/0309501 A1* | 12/2010 | Hagiuda | 358/1.13 |
| 2011/0107079 A1 | 5/2011 | Minami et al. | |
| 2012/0179804 A1 | 7/2012 | Katanp et al. | |

FOREIGN PATENT DOCUMENTS

| | | |
|---|---|---|
| JP | 2000-172600 | 6/2000 |
| JP | 2001-060180 | 3/2001 |
| JP | 2005-044355 | 2/2005 |
| JP | 2005-174244 | 6/2005 |
| JP | 2005-175736 | 6/2005 |
| JP | 2006-058938 A | 3/2006 |
| JP | 2006-085689 | 3/2006 |
| JP | 2007-041803 | 2/2007 |
| JP | 2009-053862 A | 3/2009 |
| JP | 2009-217497 A | 9/2009 |
| JP | 2010-072873 | 4/2010 |

OTHER PUBLICATIONS

PCT International Search Report and Written Opinion on Application No. PCT/JP2009/002903 dated Sep. 15, 2009; 6 pages (with partial English-language translation).

PCT International Search Report on Application No. PCT/JP2010/060999 dated Aug. 10, 2010; 7 pages (with partial English-language translation).

PCT International Search Report and Written Opinion on application No. PCT/JP2010/060064 dated Sep. 7, 2010; 5 pages (with partial translation—1 page).

Fujimoto, Koji; Windows Server 2008, Nikkei Computer 20071126, No. 692; Nov. 2007; pp. 159-164, with partial English Tranlsation.

Japan Patent Office action on application 2012-522368 mailed Aug. 6, 2013; pp. 1-5, with partial English translation.

USPTO Notice of Allowance on U.S. Appl. No. 12/937,961 mailed Jun. 3, 2013; 10 pages.

Harrington, D. et al.; An Architecture for Describing Simple Network Management Protocol (SNMP) Management Frameworks; Network Working Group RFC 3411; Dec. 2002; pp. 1-64.

Pandey, S., et al.; IP Network Topology Discovery Using SNMP; Jan. 2009, IEEE, IEEEXPLORE.IEEE.ORG/XPLS/ABS_ALL.JSP?ARNUMBER=4897254&TAG=1; 5 pages.

Schoenwaelder, J.; Simple Network Management Protocol (SNMP) Context EngineID Discovery. Network Working Group, RFC 5343; Sep. 2008; pp. 1-9.

Siamwalla, R., et al.; Discovering Internet Topology; May 1999; Cornell University, Ithaca, NY, Technical Report; www.cs.cornell.edu/skeshav/papers/discovery.pdf; pp. 1-16.

USPTO Notice of Allowance on U.S. Appl. No. 12/672,991 dated May 21, 2012; 15 pages.

USPTO Office Action on U.S. Appl. No. 12/937,961 mailed Jan. 3, 2013; 33 pages.

* cited by examiner

Configuration Information

[Srv01: Server(D-100)]
<Hardware>
CPU:...
NIC: N01(1Gb Ether)
HBA: HBA1 having P01
Disk: SDA, SDB
OS: XXX, A08k-Patched
<Connection>
N01: connected to Srv05.N01
P01: connected to FCSw.P11
...
<Configuration>
Hostname: Srv01
N01: 192.168.0.1/255.255.255.0
FS Export: SDB as "share"
Disk: use Stg01.LUN1 as SDC

*30211*

...

[Srv05 : Server(PC500)]
<Hardware>
CPU:...
NIC: N01(1Gb Ether)
HBA: HBA1 having P01
Disk: SDA, SDB
OS: XXX, A05-Patched
<Connection>
N01: connected to Srv01.N01
...
<Configuration>
Hostname: Srv05
N01: 192.168.0.2/255.255.255.0
FS Export: use Srv01."share" as NetworkDrive-D

...

[FCSw01: FC Switch(SW-A20)]
<Hardware>
FC Port: P01, P05, P09, P11
...
<Connection>
P01: connected to Stg01.P01
P05: connected to Stg02.P02
P09: connected to Stg03.P03
P11: connected to Srv01.P01
...

[FCSw02: FC Switch(FS-Ayy)]
<Hardware>
FC Port: P01, P05, P09, P11
...
<Connection>
...

[Stg01: Storage Subsystem(ST]
<Hardware>
Ctrl-A having P01
HDD: HDD1, HDD2
...
<Connection>
P01: connected to FCSw01.P01
<Configuration>
LUN1: HDD1+HDD2 with RAID1
...

[Stg02 : Storage Subsystem(Type-F)]
<Hardware>
Ctrl-A having P01, P02
HDD: HDD1, HDD2
...
<Connection>
P02: connected to FCSw01.P05
<Configuration>
LUN1: HDD1+HDD2 with RAID1

[Stg03 : Storage Subsystem(FS-Bzz)]
<Hardware>
Ctrl-A having P01
HDD: HDD1, HDD2
...
<Connection>
P01: connected to FCSw01.P09
<Configuration>
LUN1: HDD1+HDD2 with RAID1
...

FIG. 7

Performance Information _3022

| Performance ID 30221 | Apparatus Name 30222 | Configuration Information 30223 | Plug-in ID 30224 | Metric 30225 | Date/Time 30226 | Value 30227 |
|---|---|---|---|---|---|---|
| 1 | Server_A | Disk_1 | 1 | DB Free Space | 2010/04/23 08:00:00 | 84230 |
| 2 | Server_A | Disk_1 | 1 | DB Free Space | 2010/04/23 09:00:00 | 65439 |
| 3 | Server_A | Disk_1 | 1 | DB Free Space | 2010/04/23 10:00:00 | 765 |
| 4 | Server_A | CPU_1 | — | CPU Utilization | 2010/04/23 08:00:00 | 22 |
| 5 | Server_A | CPU_1 | — | CPU Utilization | 2010/04/23 09:00:00 | 23 |
| 6 | Server_B | CPU_1 | — | CPU Utilization | 2010/04/23 08:00:00 | 45 |
| 7 | Server_B | CPU_1 | — | CPU Utilization | 2010/04/23 09:00:00 | 30 |
| ... | ... | ... | ... | ... | ... | ... |

FIG. 8

Event Information 3023

| Event ID 30231 | Apparatus Name 30232 | Configuration Information 30233 | Plug-in ID 30234 | Date/Time 30235 | Type 30236 | Metric 30237 | Event Resource 30238 |
|---|---|---|---|---|---|---|---|
| 1 | Server_A | Disk_1 | 1 | 2010/04/23 10:00:00 | Warning | DB Free Space | Perf_0012 |
| 2 | Server_B | Port_2 | — | 2010/04/25 16:51:21 | Error | Port Connection | Status_0007 |
| ... | ... | ... | ... | ... | ... | ... | ... |

FIG. 9

```xml
<Plugin id="com.hhh.server_plugin" name="HHH Server" >
  <NodeDiscovery ownProtocol="SSH">
    <Input protocol="SSH">
      <Structure>
        <Command>/bin/hostname</Command>
        <Value name="sysName" SSH.row="0" SSH.column="0" />
      </Structure>
      <Structure>
        <Command>ls $HOME/isv.txt</Command>
        <Value name="text" SSH.row="0" SSH.column="0" />
      </Structure>
      <StructureSet name="com">
        <Command>cat $HOME/isv.txt</Command>
        <Member name="name" SSH.column="0" />
        <Member name="id" SSH.column="1" />
        <Member name="status" SSH.column="2" />
      </StructureSet>
    </Input>
    <Filter><![CDATA[ sysName =~ ".+" && text != ""]]></Filter>
    <Node icon="server1.gif" nodeIcon="server2.gif" sectionIcon="server3.gif">
      <Attr name="nodeName">%sysName%</Attr>
      <Attr name="nodeType">Computer</Attr>
      <Attr name="vendor">AAAi</Attr>
    </Node>
    <Component ...>
      ... Defines a component under the node
    </Component>
  </NodeDiscovery>
  <ComponentStatus ...>
    ...Defines how to monitor the component
  </ComponentStatus>
  <EventInterface ...>
    ... Defines what to do when an SNMP trap is recieved
    <Event ...>
      ... Defines the mapping between the recieved trap and an Argus event
      <Message id="LOW_DISK_SPACE"> ... </Message>
    </Event>
  </EventInterface>
</Plugin>
```

Template Application Information — 3027

| Template ID (30271) | Applied Apparatus (30272) |
|---|---|
| 1 | Server_A |
| 2 | Server_B |
| 3 | Server_A |
| 4 | Storage_B, Storage_C |

FIG. 13

Plug-in Management Information — 3028

| Plug-in ID (30281) | Plug-in Name (30282) | Plug-in Storage Destination (30283) |
|---|---|---|
| 1 | DB Plug-in | C:¥abc¥plugins¥1 |
| 2 | Mail Plug-in | C:¥abc¥plugins¥2 |
| 3 | Storage Plug-in | C:¥abc¥plugins¥3 |

FIG. 14

Template Management Information — 3029

| Template ID (30291) | Plug-in ID (30292) | Template Name (30293) | Template Storage Destination (30294) |
|---|---|---|---|
| 1 | 11 | Default DB Plug-in | C:¥abc¥templates¥1 |
| 2 | 12 | Low Spec Server Template | C:¥abc¥templates¥2 |
| 3 | 13 | Default for Mail Plug-in | C:¥abc¥templates¥2 |
| 4 | 14 | Default for Storage Plug-in | C:¥abc¥templates¥3 |

FIG. 22

Template Creation and Change Screen — G40

New Template Name: Low Spec Server Template

Template Type: DB Plug-in ▶

Template: Default for DB Plug-in ▶

G41

Apply

G42

| Metric | Warning | Error |
|---|---|---|
| CPU Utilization | > 80% | > 90% |
| Memory Utilization | > 90% | > 95% |
| Disk Free Space | < 1000MByte | < 500MByte |

OK    Cancel

FIG. 24

Template Setting Status and Change Screen (Multiple Templates)

Select Template — G61

| Template Type | Nodes | Current Templates | New Templates |
|---|---|---|---|
| Server | Server_A | Default for Server | (Current Template) ▶ |
| DB Plug-in | Server_A | Default for DB Plug-in | Finance DB Template ▶ |
| Network Card Plug-in | Server_A | High Spec Template | (Current Template) ▶ |

Threshold Value (Finance DB Template) : — G62

| Metric | Warning | Error |
|---|---|---|
| Disk Free Space | < 1000MByte | < 500MByte |

OK  Cancel

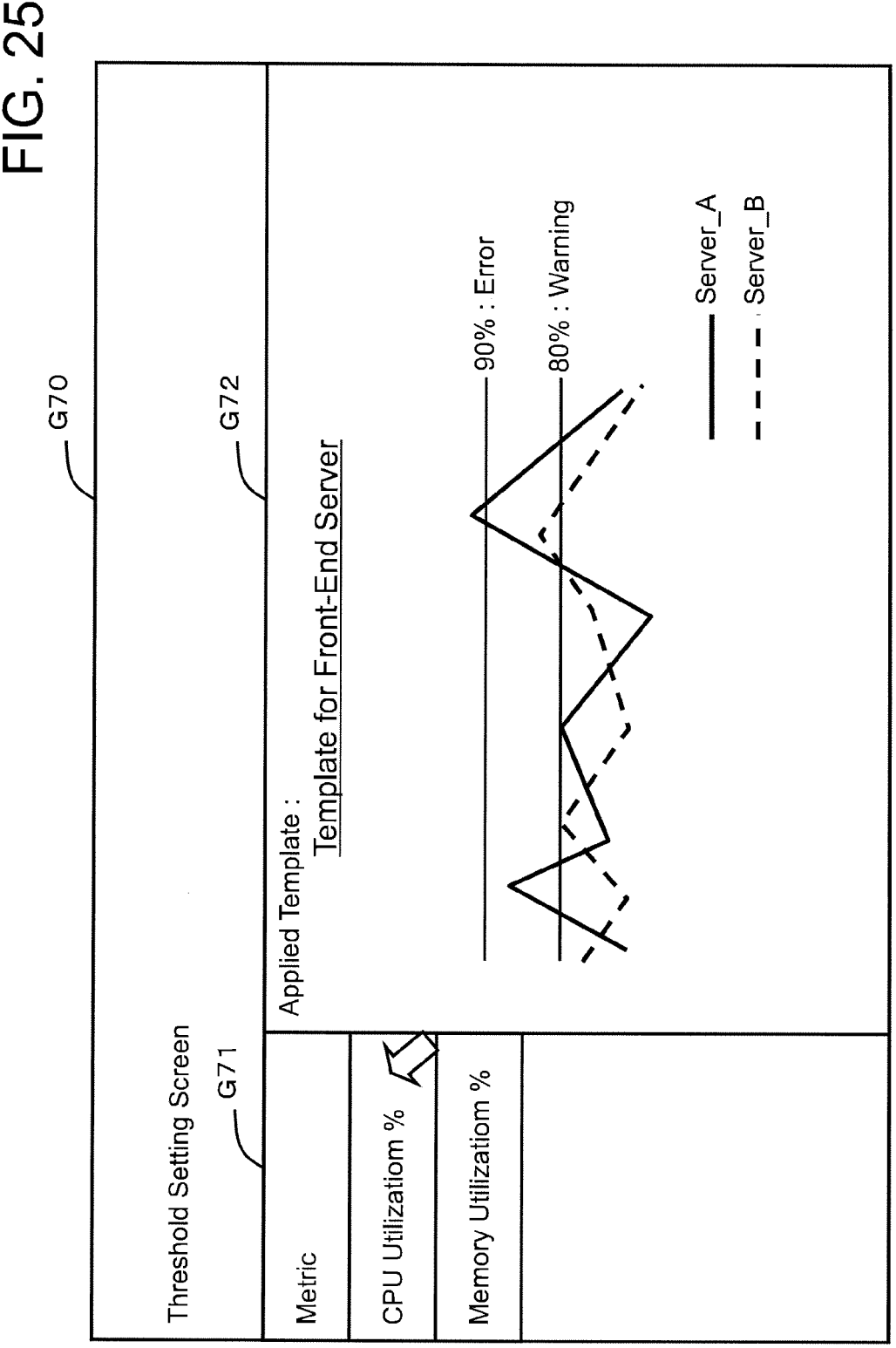

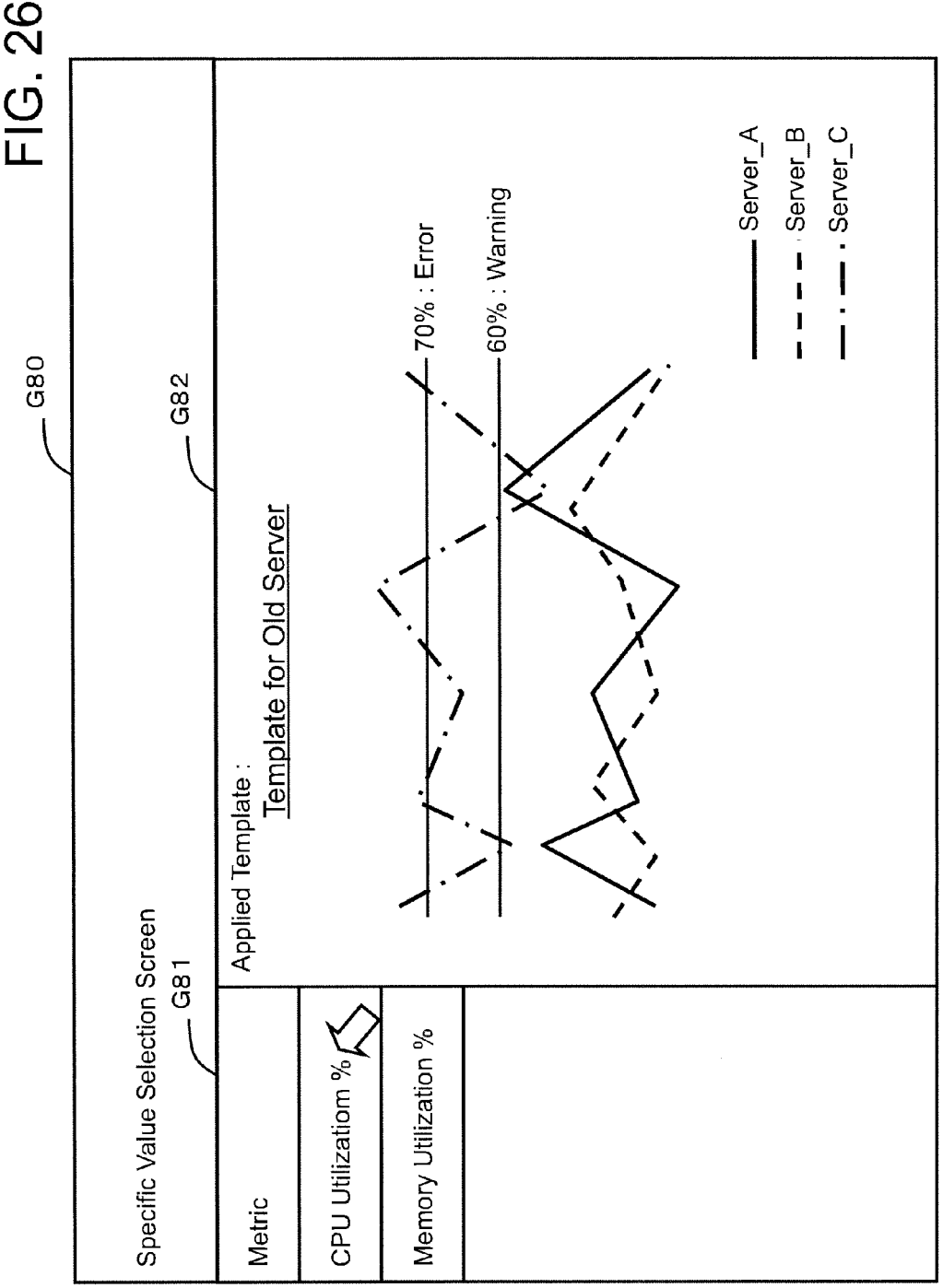

MANAGEMENT SYSTEM AND COMPUTER SYSTEM MANAGEMENT METHOD

TECHNICAL FIELD

The present invention relates to a management system and a computer system management method.

BACKGROUND ART

A computer system, for example, is comprised by coupling various types of node apparatuses, such as a host computer, a storage apparatus, a switch apparatus, and so forth to a communication network. The management of each node apparatus included in the computer system is an important task from the standpoint of operating the computer system.

In order to manage a node apparatus, information must be acquired from this node apparatus. As technology for acquiring information from the node apparatus, for example, the technology disclosed in Patent Literature 1 is known. According to Patent Literature 1, a business apparatus comprising an IP address in a range of specified IP addresses is detected, and information is acquired from the detected business apparatus.

CITATION LIST

Patent Literature

[PTL 1]
Japanese Patent Application Laid-Open No. 2005-175736

SUMMARY OF INVENTION

Technical Problem

To manage a node apparatus that has been newly added to the computer system, it is necessary to use a threshold that is suitable for this node apparatus. In the past, a user, who is the administrator of the computer system, had to configure a threshold for managing a node apparatus that had been newly added to the computer system. A skilled user may be able to configure an appropriate threshold based on experience and intuition. However, for the unskilled user, properly configuring a threshold for a new node apparatus is difficult, and makes the task of management troublesome.

Accordingly, an object of the present invention is to provide a management system and computer system management method that makes it possible to more simply manage a management target apparatus. Other objects of the present inventions should become clear from the description of the embodiment presented below.

Solution to Problem

One embodiment of the present invention is a management system, which comprises a communication interface for coupling with a plurality of management target apparatuses, a memory for storing at least a management program, and a microprocessor for executing the management program, wherein the memory also stores added component information, which corresponds to a predetermined management target apparatus of the respective management target apparatuses and describes either a procedure or a setting for acquiring management information from the predetermined management target apparatus, and management setting information, which is associated with the predetermined management target apparatus and used for managing the predetermined management target apparatus based on the management information, and the microprocessor, in accordance with executing the management program, (1) respectively receives delivery added component information, which constitutes a basis of the added component information stored in the memory, and delivery management setting information, which constitutes a basis of the management setting information stored in the memory, and stores the added component information and the management setting information in the memory, (2) uses the added component information stored in the memory to acquire the management information from the predetermined management target apparatus, and (3) manages the predetermined management target apparatus based on the acquired management information and the management setting information stored in the memory.

In the one embodiment, a threshold for determining a status of the management information is included in the management setting information, and in a case where the management information has reached the threshold, the microprocessor correspondingly outputs a predetermined alert and identification information for identifying the management setting information related to the predetermined alert.

The microprocessor, in a case where the management setting information is associated with a plurality of predetermined management target apparatuses, may output information denoting the plurality of predetermined management target apparatuses when the threshold changes.

The present invention may be understood as a management method for the computer system. In addition, at least a portion of the configuration of the present invention may be configured as a computer program. The computer program can be distributed by being affixed to a recording medium, or delivered by way of a communication medium. Furthermore, the configuration may be such that either all or part of the computer program is realized as a dedicated hardware circuit.

BRIEF DESCRIPTION OF DRAWINGS

FIG. 6 is a block diagram of configuration information.
FIG. 7 is a block diagram of performance information.
FIG. 8 is a block diagram of event information.
FIG. 9 is a block diagram of plug-in definition information.
FIG. 12 is a block diagram of template application information.
FIG. 13 is a block diagram of plug-in management information.
FIG. 14 is a block diagram of template management information.

FIG. 22 is a template creation and change screen.

FIG. 24 is a setting status of a plurality of templates and change screen.

FIG. 25 is a screen for displaying graphs of a plurality of performance histories in an overlapping fashion.

FIG. 26 shows a screen for displaying graphs that show specific performance histories by distinguishing one graph from another.

DESCRIPTION OF EMBODIMENTS

Figure 1:
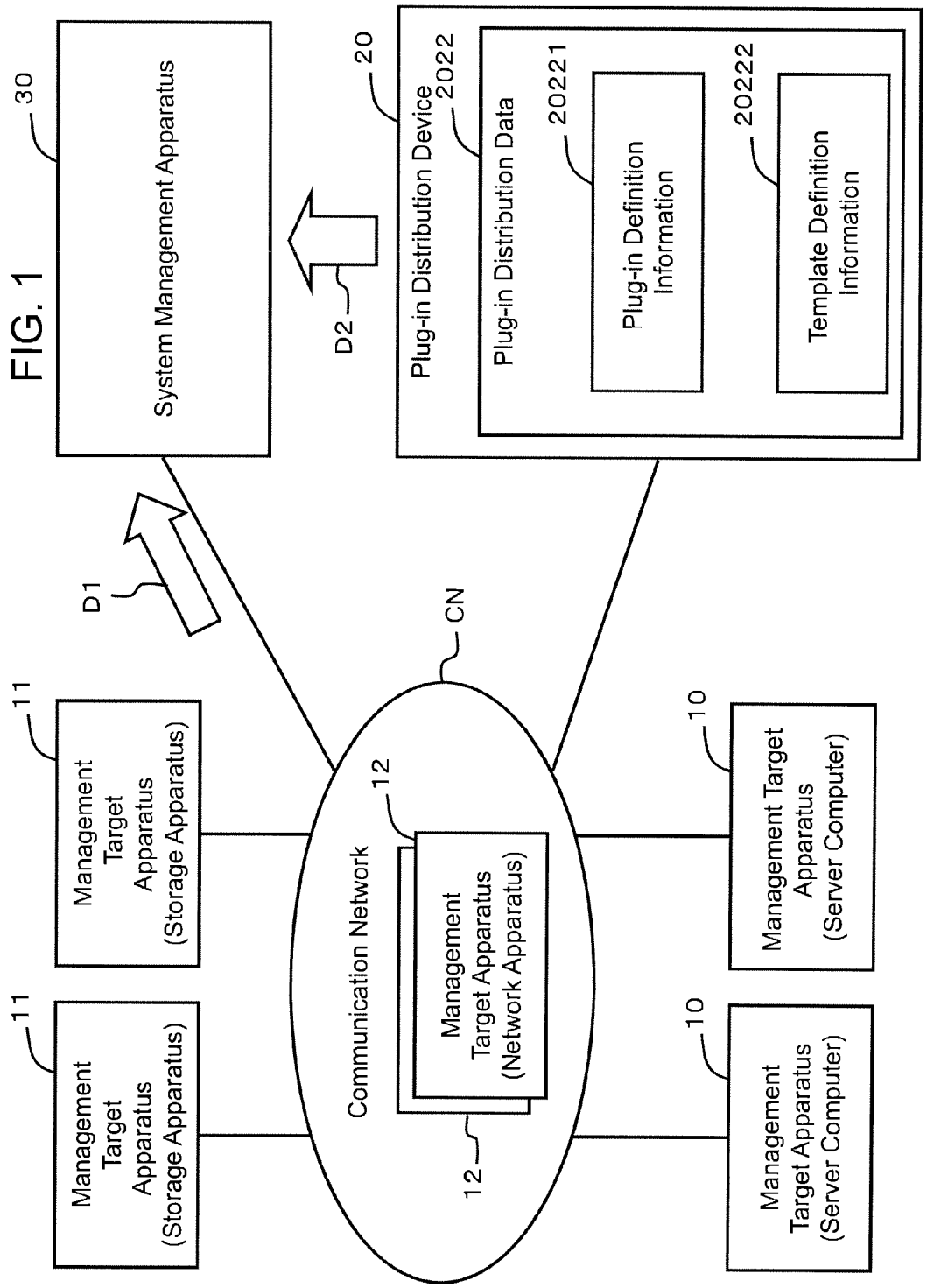
FIG. 1 is an overall block diagram of a computer system.

One embodiment of the present invention will be explained hereinbelow by referring to the drawings. In this embodiment, as will be described below, when a plug-in for adding a management target is delivered to the system management apparatus, a template that is suitable for this plug-in is also delivered together with the plug-in. In addition, in this embodiment, the user, who is the system administrator, is able to change the setting contents of a template relatively easily.

Furthermore, in the following explanation, for example, "information" may be explained using expressions such as abc table, abc list, abc database, or abc queue. However, the information described in this embodiment may comprise a structure other than a table structure, a list structure or a database structure. In addition, in a case where an information configuration is explained, for example, expressions such as identifier, identification information, name and ID may be used, and these terms are interchangeable.

In addition, the respective processes described hereinbelow are realized by the microprocessor reading and executing respective programs stored in the memory. Therefore, the subject of the processing may be a program or the microprocessor. Or, the explanation may be given by using either the system management apparatus or a controller as the subject of each process.

Example 1

FIG. 1 shows a computer system comprising a system management apparatus. The computer system comprises a plurality of management target apparatuses 10, 11, 12, a plug-in distribution apparatus 20, a system management apparatus 30 as the "management system", and a communication network CN for coupling these respective apparatuses 10, 11, 12, 20, 30.

A plurality of types of apparatuses are included among the management target apparatuses. One management target apparatus 10 is a server computer. The server computer provides various services to a client computer not shown in the drawing by executing an application program. This may be called the server computer 10 hereinafter. One other management target apparatus 11 is a storage apparatus. The storage apparatus stores data that is used by the server computer. This may be called the storage apparatus 12 hereinafter. Yet one other management target apparatus 12 is a network apparatus. The network apparatus, for example, comprises either a switch apparatus or a router apparatus. This may be called the network apparatus 12 hereinafter.

The preceding are examples, and another apparatus besides the apparatuses mentioned above may be used as a management target apparatus. Furthermore, the management target apparatus may be called a node apparatus in the following explanation for the sake of convenience. Furthermore, the management target is not limited to the apparatus as a whole, but rather may also be either the hardware or software that comprises a portion of the apparatus.

The plug-in distribution apparatus 20, for example, may be comprised like a website that is operated by each vendor providing the node apparatuses 10 through 12. The operating entity is not limited to the vendor, and, for example, may also be either a system maintenance professional or a software vendor. Furthermore, in FIG. 1, only one plug-in distribution apparatus 20 is shown, but a plurality of plug-in distribution apparatuses 20 corresponding to the respective vendors may exist.

The plug-in distribution apparatus 20 holds plug-in distribution data 2022. The plug-in distribution data 2022 comprises plug-in definition information 20221 and template definition information 20222. The plug-in definition information 20221 corresponds to the "delivery added component information" and the template definition information 20222 corresponds to the "delivery management setting information".

The plug-in distribution apparatus 20, either in response to a request from the system management apparatus 30 or without waiting for a request from the system management apparatus 30, sends the plug-in distribution data 2022 to the system management apparatus 30 via the communication network CN. The transfer of the plug-in distribution data 2022 is indicated by an arrow D2.

In a case where a new node apparatus has been added to the computer system, for example, the user is able to access the plug-in distribution apparatus 20 and acquire the plug-in distribution data 2022 corresponding to this new simple target apparatus. Furthermore, the configuration may also be such that the plug-in distribution data 2022 is automatically sent from the plug-in distribution apparatus 20 to the system management apparatus 30 either before or after the new node apparatus has been provided on the market by the vendor.

The system management apparatus 30 fetches the plug-in definition information 20221 and the template definition information 20222 from the plug-in distribution data 2022, and, as will be described using FIG. 5, creates plug-in definition information 3024 and template definition information 3025, and stores this information 3024 and 3025 in a storage resource 302.

The storage management apparatus 30 collects information from the node apparatuses 10 through 12 based on the plug-in definition information 3024. The information D1 that the system management apparatus 30 collects from the node apparatuses 10 through 12, for example, comprises configuration information and performance information. The system management apparatus 30 determines whether or not the node apparatuses 10 through 12 are in normal states by comparing the performance information with thresholds, and outputs the determination results.

The template definition information 3025 comprises an initial threshold. The initial threshold is configured beforehand by a vendor or the like as a value that is suitable for the plug-in definition information 3024 to which the template definition information 3025 is associated. The user may either use the initial threshold as-is, or may utilize various types of support processes for changing a threshold, which will be explained below, to change the initial threshold and use the changed threshold.

The plug-in definition information is associated with a predetermined node apparatus, and is for acquiring configuration information and/or performance information from the predetermined node apparatus. Predetermined node apparatus signifies a computer apparatus that has been added anew to the computer system and/or the hardware or software comprising this computer apparatus. For example, using the status at the time of system construction as the criteria, a software component, which is among the software components newly installed in the system management apparatus 30 and which is used to manage a node apparatus, may also be called the plug-in definition information. However, the plug-in definition information is not limited to this definition.

The plug-in definition information 3024 will be described in detail below using FIG. 9. Suffice it to say here that the plug-in definition information 3024, for example, comprises at least one or more of the following information, i.e. a method for acquiring information from the node apparatus (for example, types of communication protocols and login information), items of information that should be acquired from the node apparatus (for example, a product name, a status value, a performance value, and the like), and information for mapping the information acquired from the node apparatus to a node management model (for example, information that identifies an icon).

The plug-in definition information 3024, for example, may be any form, to include a file format, one row of a table, or a program format. For example, the plug-in definition information 3024 may be a configuration that stores a procedure for acquiring information from the node apparatus, or may be comprised as a program for acquiring information from the node apparatus.

The system management apparatus 30 accesses the node apparatus on the basis of the plug-in definition information 3024, and acquires the information required from the node apparatus. The node apparatus from which the information is accurately read out by the system management apparatus 30 is treated as a new management target. Furthermore, the configuration may also be such that the system management apparatus 30 does not access the node apparatus and read the information, but rather the node apparatus sends the information to the system management apparatus 30.

Furthermore, the system management apparatus 30 may be able to acquire information from the node apparatus without using the plug-in definition information 3024. For example, in the case of a node apparatus that was included at the time the computer system was initially constructed, the method for accessing this node apparatus and the item (s) to be acquired are known to the system management apparatus 30. Therefore, the system management apparatus 30 is able to acquire information from the node apparatus without using the plug-in definition information 3024. Alternatively, in the case of a new type node apparatus (or a new management item) that has been subsequently added to the computer system, the system management apparatus 30 often does not know the method for acquiring information from this new node apparatus or the item (s) of information to be acquired. Therefore, the system management apparatus 30 obtains the plug-in definition information corresponding to the new node apparatus from the plug-in distribution apparatus 20.

Figure 2:
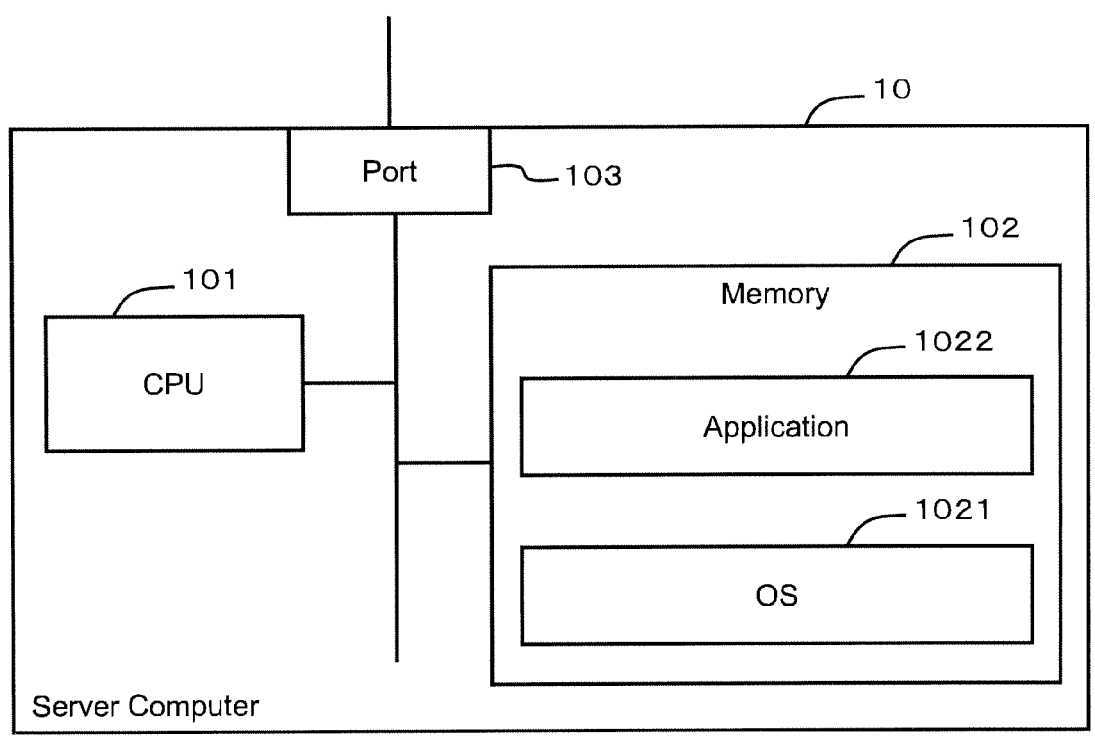
FIG. 2 is a block diagram of a server computer.

FIG. 2 shows the configuration of a server computer, which is one of the node apparatuses. The server computer 10, for example, comprises a microprocessor 101 (the microprocessor is displayed as CPU (Central Processing Unit) in the drawing), a memory 102, and a communication port 103.

The microprocessor 101 realizes a predetermined service or function by reading and executing an operating system (OS) 1021 and an application program 1022 that is stored in the memory 102. As the application program 1022, for example, a customer management program, a sales management program, an image delivery program, and a document management program may be cited. The server computer 10 couples to the communication network CN via the communication port 103, and communicates with the system management apparatus 30 and a client computer not shown in the drawing.

The memory 102 comprises a storage resource, such as a ROM (Read Only Memory), a RAM (Random Access Memory), or an auxiliary storage device. That is, the memory 102 may include either one or a plurality of storage areas. The memory 102 is not limited to one type of semiconductor memory, but rather is a concept that includes other types of storage devices, such as an auxiliary storage device. This holds true in the following explanation as well.

Figure 3:
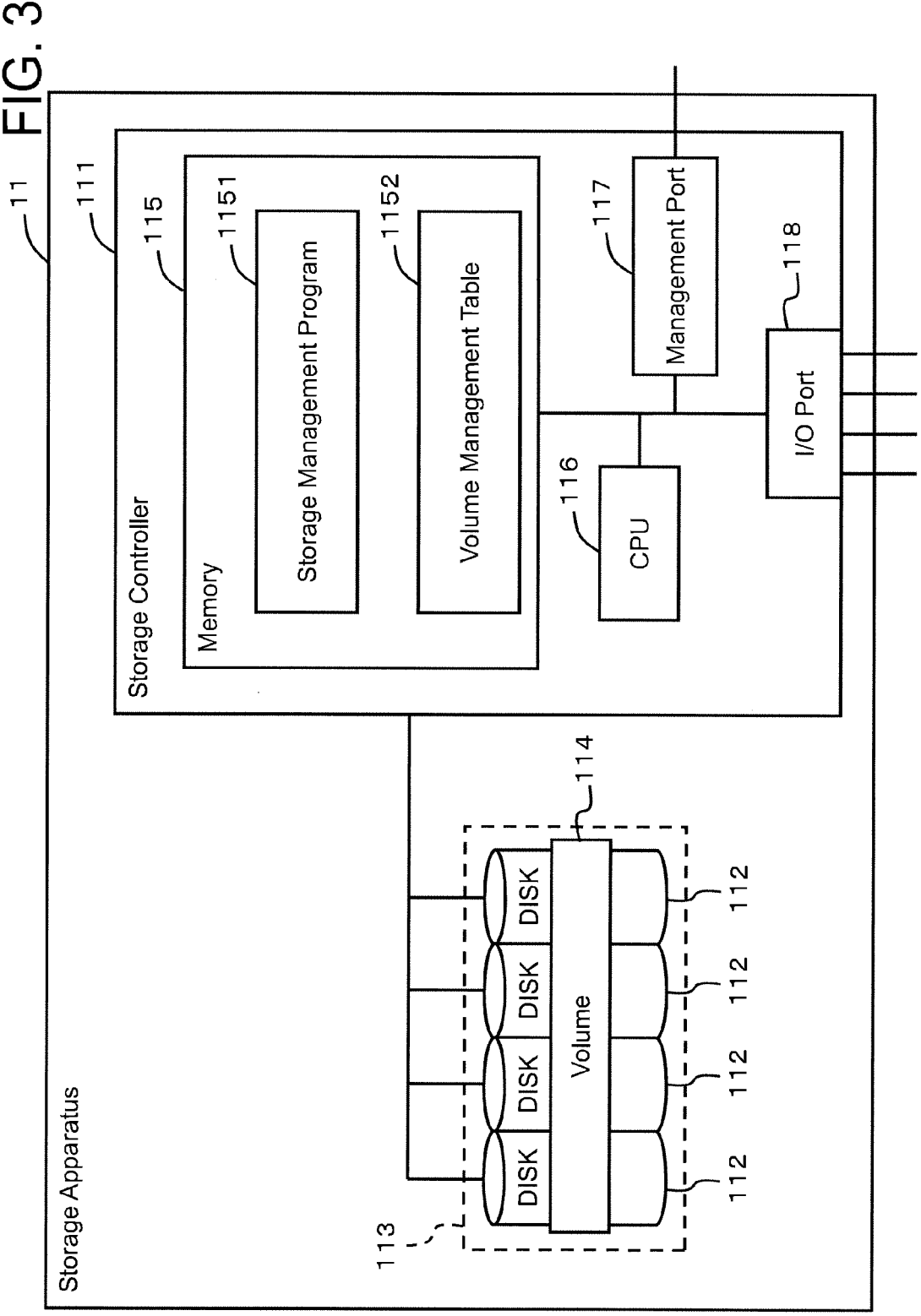
FIG. 3 is a block diagram of a storage apparatus.

FIG. 3 shows the configuration of a storage apparatus 11, which is one of the other node apparatuses. The storage apparatus 11, for example, comprises a storage controller 111, and a storage device 112.

The storage device 112, for example, comprises a device that is able to read and write data, such as a hard disk device, a semiconductor memory device, an optical disk device, a magneto-optical disk device, or a magnetic tape device.

In a case where a hard disk device is used as the storage device, for example, a FC (Fibre Channel) disk, a SCSI (Small Computer System Interface) disk, a SATA disk, an ATA (AT Attachment) disk, or a SAS (Serial Attached SCSI) disk can be used.

For example, it is also possible to use a variety of storage devices, such as a flash memory, a FeRAM (Ferroelectric Random Access Memory), a MRAM (Magnetoresistive Random Access Memory), an Ovonic Unified Memory, and a RRAM (Resistance RAM). In addition, for example, the configuration may also be such that different types of storage devices are intermixed, such as a combination of a flash memory and a hard disk.

A plurality of storage devices 112 may be collected together into a single RAID group 113. The RAID group 113 is also called a parity group. The RAID group 113 virtualizes the physical storage areas of the respective plurality of storage devices 112 as a single physical storage area. This single physical storage area can be used to create either one or plurality of logical storage areas. This logical storage area is called a logical volume 114 (or a logical storage device).

The storage controller 111 controls the operation of the storage apparatus 11. The storage controller 111, for example, comprises a memory 115, a microprocessor 116, a management port 117, and an I/O (Input/Output) port 118.

The memory 115, for example, stores a storage management program 1151 and a volume management table 1152. The storage management program 1151 is for controlling the operation of the storage apparatus 11. The storage management program 1151 executes a predetermined process in accordance with an instruction from either the server computer 10 or the system management apparatus 30, and returns the result of this processing. Specifically, the storage management program 1151 comprises an I/O processing program for processing a write command and a read command, and a status management program for managing the status inside the storage apparatus 11.

The volume management table 1152 manages the configuration of the respective volumes 114. For example, the volume management table 1152 correspondingly manages a volume number, a volume size, a RAID group number, a RAID level, and a list of storage device numbers.

The microprocessor 116 processes various types of commands received form the server computer 10 and responds to a request from the system management apparatus 30 by reading and executing the storage management program 1151.

The management port 117 is a communication port for communicated with the system management apparatus 30 via the communication network CN. The I/O port 118 is a communication port for communicating with the server computer 10 via the communication network CN.

Furthermore, the configuration of the network apparatus 12 as a node apparatus has been omitted from the drawing. The network apparatus 12, for example, may comprise plurality of communication ports, and a control circuit for controlling the operation of the respective communication ports.

Figure 4:
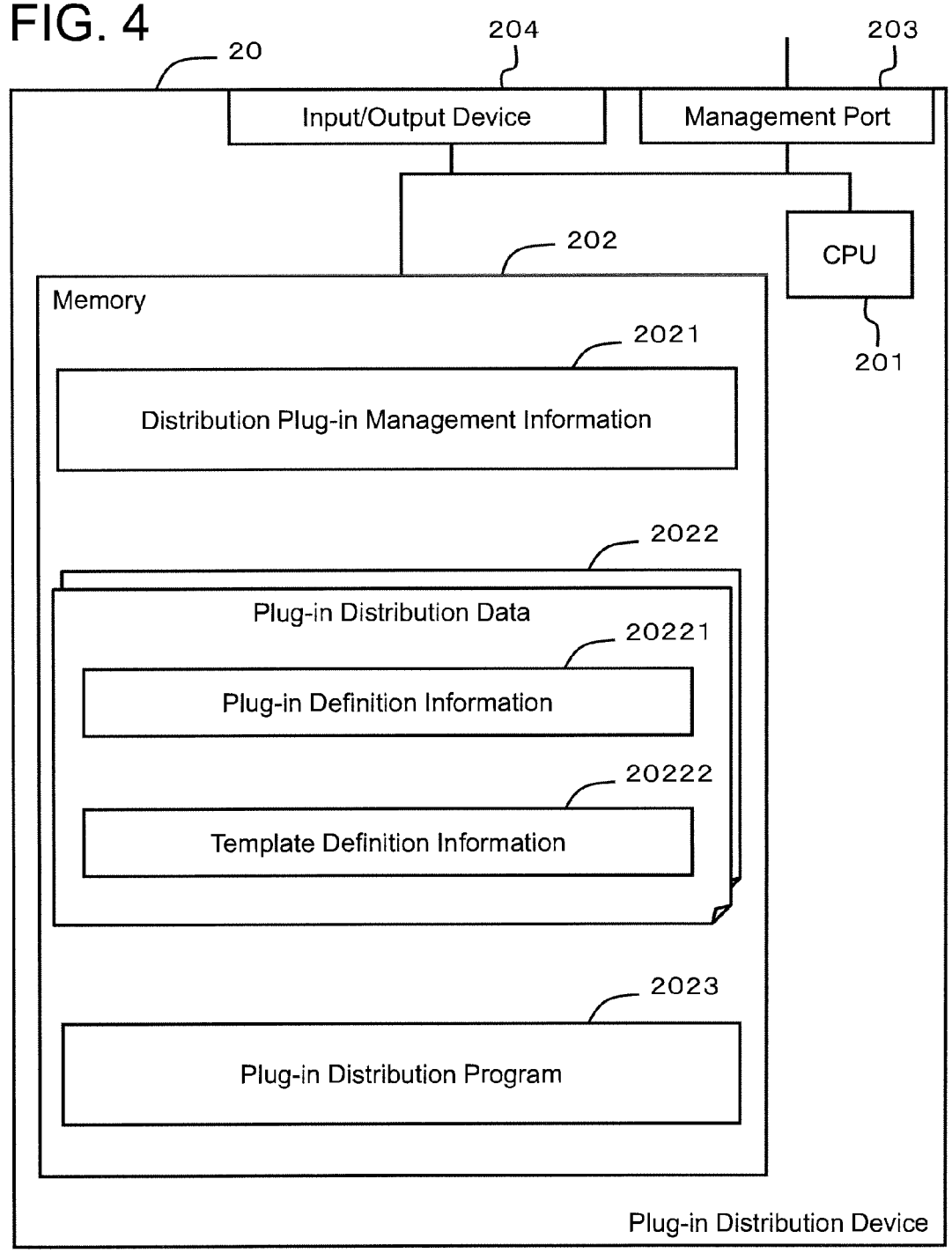
FIG. 4 is a block diagram of a plug-in distribution apparatus.

FIG. 4 shows the configuration of the plug-in distribution apparatus 20. The plug-in distribution apparatus 20, for example, comprises a microprocessor 201, a memory 202, a management port 203, and an input/output device 204.

The memory 202, for example, stores distribution plug-in management information 2021, plug-in distribution data 2022, and a plug-in distribution program 2023. The distribution plug-in management information 2021 is for managing the plug-in distribution data 2022. The plug-in distribution data 2022 is data to be delivered to the system management apparatus 30, and comprises plug-in definition information 20221 and template definition information 20222. The plug-in distribution program 2023 is for sending the plug-in distribution data 2022 to the system management apparatus 30.

The microprocessor 201 delivers the plug-in distribution data 2022 to the system management apparatus 30 by executing the plug-in distribution program 2023. The management port 203 is a communication port for communicating with the system management apparatus 30 via the communication network CN. The input/output device 204 is for exchanging information with the user. The input/output device 204, for example, may include anyone or a plurality of a display device, a voice output device, a printing device, a keyboard, a voice input device, and a tablet.

Figure 5:
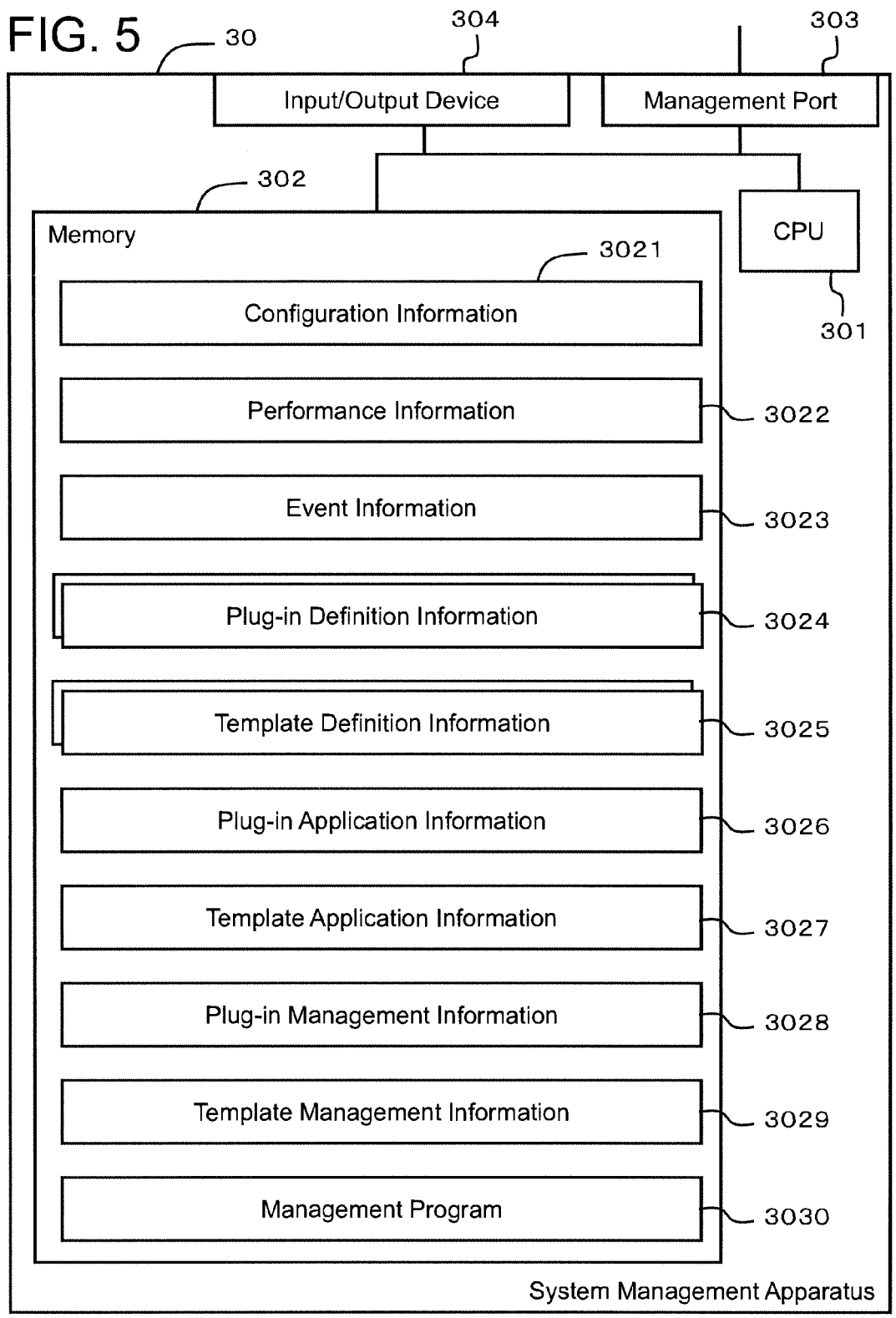
FIG. 5 is a block diagram of a system management apparatus.

FIG. 5 shows the configuration of the system management apparatus 30. The system management apparatus 30, for example, comprises a microprocessor 301, a memory 302, a management port 303, and an input/output device 304.

The memory 302, for example, stores configuration information 3021, performance information 3022, event information 3023, plug-in definition information 3024, template definition information 3025, plug-in application information 3026, template application information 3027, plug-in management information 3028, template management information 3029 and a management program 3030. The respective information 3021 through 3029 will be explained below using other drawings.

The microprocessor 302 realizes a predetermined process by reading and executing the management program 3030. For example, the microprocessor 302 installs the plug-in definition information 3024 and the template definition information 3025 based on the plug-in distribution data 2022. The microprocessor 301 acquires required information from a discovered management-target node apparatus based on the plug-in definition information 3024.

The microprocessor 301 determines whether the status of a node apparatus is normal or abnormal by comparing the acquired information to a threshold described in the template definition information 3025, and outputs a warning when the status is abnormal.

Furthermore, the threshold described on the template definition information 3025 is an initial value, and the user may change the initial threshold. The microprocessor 301 provides the user with information that is useful for changing the threshold. The user is able to change the threshold to an appropriate value while referring to this information.

The management port 303 is a communication port for communicating with the plug-in distribution apparatus 20 and the respective node apparatuses via the communication network CN. The input/output device 304 is for exchanging information with the user, and, as described using FIG. 4, may include a display device, a keyboard, and so forth.

Furthermore, the system management apparatus 30 does not have to be comprised of a single computer, but rather may comprise a single system management apparatus made up of a plurality of computers. Further, the system management apparatus 30 does not have to manage the respective node apparatuses one at a time, but rather may also group a plurality of node apparatuses together and manage them in group units.

FIG. 6 shows an example of the configuration information 3021. The configuration information 3021 stores the configuration information of each node apparatus that is a management target of the system management apparatus 30. For example, the hardware configuration and software configuration of the server computer 10 are listed in the locations indicated by the reference signs 30211. Specifically, the name of the server computer, the CPU type, the memory type and size, the type and size of the auxiliary storage device, the IP address, and the LUN (Local Area Network) allocated to the server computer.

Similarly, the hardware configurations, software configurations, and IP addresses of the storage apparatus 11 and the network apparatus 12 are also stored in the configuration information 3021. In the case of the storage apparatus 11, for example, the RAID configuration, the type and number of storage devices, and the number of communication ports is also stored. In the case of the network apparatus 12, for example, the coupling destinations of the respective communication ports are stored in addition to the apparatus names and IP addresses. Furthermore, as long as the information is accessible, the system management apparatus 30 is not limited to the IP address. For example, instead of the IP address, a network identifier such as an iSCSI (internet Small Computer System Interface) name may be used.

FIG. 7 shows an example of the configuration of the performance information 3022. The performance information 3022, for example, is a measurement value, like either a CPU utilization rate or a memory utilization rate, for each type of function of the node apparatus.

The performance information 3022, for example, associates a performance ID 30221, an apparatus name 30222, configuration information 30223, a plug-in ID 30224, a metric 30225, a date/time 30226, and a value 30227.

The performance ID 30221 is information for identifying the performance value 30227. The apparatus name 30222 is information for identifying a node apparatus that is the target of a performance value measurement. The configuration information 30223 is information for identifying a measurement target configuration. The plug-in ID 30224 is information for identifying the plug-in definition information to be used for acquiring the measurement value from the node apparatus. The metric 30225 is information showing the measurement target. The data/time 30226 shows the date and time of the performance value measurement. The value 30227 is the value of the measured performance.

The performance information 3022, for example, stores the result at a certain hour and minute obtained by measuring the value of the free space of a database that uses "Disk 1" of the respective disks of server A. A case where an ID is configured in the plug-in ID 30224 signifies that this performance value has been acquired in accordance with the plug-in definition information identified by the plug-in ID 30224. A case where the plug-in ID 30224 is blank signifies that this performance value has been acquired without using the plug-in definition information. That is, it signifies that the node apparatus is one that the system management apparatus 30 has known about since the computer system was initially constructed.

FIG. 8 shows an example of the event information 3023. The event information 3023 is for managing an event detected by the system management apparatus 30. The event information 3023, for example, correspondingly stores an event ID 30231, an apparatus name 30232, configuration information 30233, a plug-in ID 30234, a type 30236, a metric 30237, and an event resource 30238.

The event ID 30231 is information for identifying respective events. The apparatus name 30232 is the name of the node apparatus in which the event occurred. The configuration information 30233 is for identifying the configuration in which the event occurred. The plug-in ID 30234 is information for identifying the plug-in definition information that was used to acquire the information of the event. The datetime 30235 shows the data and time at which the event occurred.

The type 30236 shows the type of event. As event types, for example, warning and error are used. The metric 30237 shows the metric for which the event occurred, that is, the type of performance value for which the event occurred. The event resource 30238 shows the reason or cause of the event.

FIG. 9 shows an example of the configuration of the plug-in definition information 3024. The plug-in definition information 3024, for example, is created using a structured tag language like XML (eXtensible Markup Language). The plug-in definition information 3024 comprises a plug-in ID, node discovery definition information 30241 and node monitoring definition information 30242.

The plug-in ID is described in the route tag (the tag that comprises the Plugin id) as shown in first row of FIG. 9.

The node discovery definition information 30241 denotes a definition related to a node apparatus discovery method. The node discovery definition information 30241, for example, comprises support protocol information, used protocol information, condition information, node creation information, and component creation information.

The support protocol information denotes one or more types of protocols (hereinafter, the support protocol). In the example of FIG. 9, the SSH of "ownProtocol='SSH'" corresponds to the support protocol. For example, the support protocol types may be the same as the used protocol types, which will be explained hereinbelow, or may be more numerous types than the used protocol types.

The used protocol information denotes the protocol used when acquiring the information from the node apparatus. According to the example of FIG. 9, the SSH of the "input protocol='SSH'" corresponds to the used protocol. That is, in the example of FIG. 9, the support protocol type is the same as the used protocol type.

The condition information comprises information denoting a condition related to the information to be acquired from the node apparatus. The condition information in FIG. 9 is described between <Filter> and </Filter>. This information, for example, comprises the item(s) of information to be acquired (for example, vendor name, and product name).

The node creation information denotes a node creation method. According to the example of FIG. 9, the node creation information is described between <Node icon=> and </Node>. This information, for example, comprises an attribute (for example, a node name, a node type, and a vendor name) held as the node (information) to be created.

The component creation information denotes a component (a software component) creation method. In the example of FIG. 9, the component creation information is described between <Component> and </Component>. The component is created under the created node.

The node monitoring definition information 30242 denotes a definition related to a node apparatus monitoring method. The node monitoring definition information 30242 comprises component status information 30242A and event interface information 30242B.

The component status information 30242A is related to the definition of a method for regularly updating the component status. According to the example of FIG. 9, this information 30242A is described between <ComponentStatus> and </ComponentStatus>.

The event interface information 30242B denotes the definitions of the component status update and the event occurrence in accordance with receiving a SNMP (Simple Network Management Protocol) trap. In the example of FIG. 9, this information 30242B is described between <EventInterface> and </EventInterface>.

The preceding has been an explanation of the plug-in definition information 3024. Furthermore, a different file or data may be related to the plug-in definition information 3024. For example, the configuration may also be such that either a message resource file, which stores a warning message and the like for output when an event has been detected, or an icon resource file, which stores information denoting an icon that is displayed on a GUI (Graphical User Interface), are related to the plug-in definition information 3024.

The plug-in definition information 3024 may be the same as the plug-in definition information 20221 inside the plug-in distribution data 2022. That is, the configuration may be such that the system management apparatus 30 uses the plug-in definition information 20221 extracted from inside the plug-in distribution data 2022 as-is. Similarly, the configuration may also be such that the system management apparatus 30 uses the template definition information 20222 extracted from the plug-in distribution data 2022 as the template definition information 3025 as-is.

Figure 10:
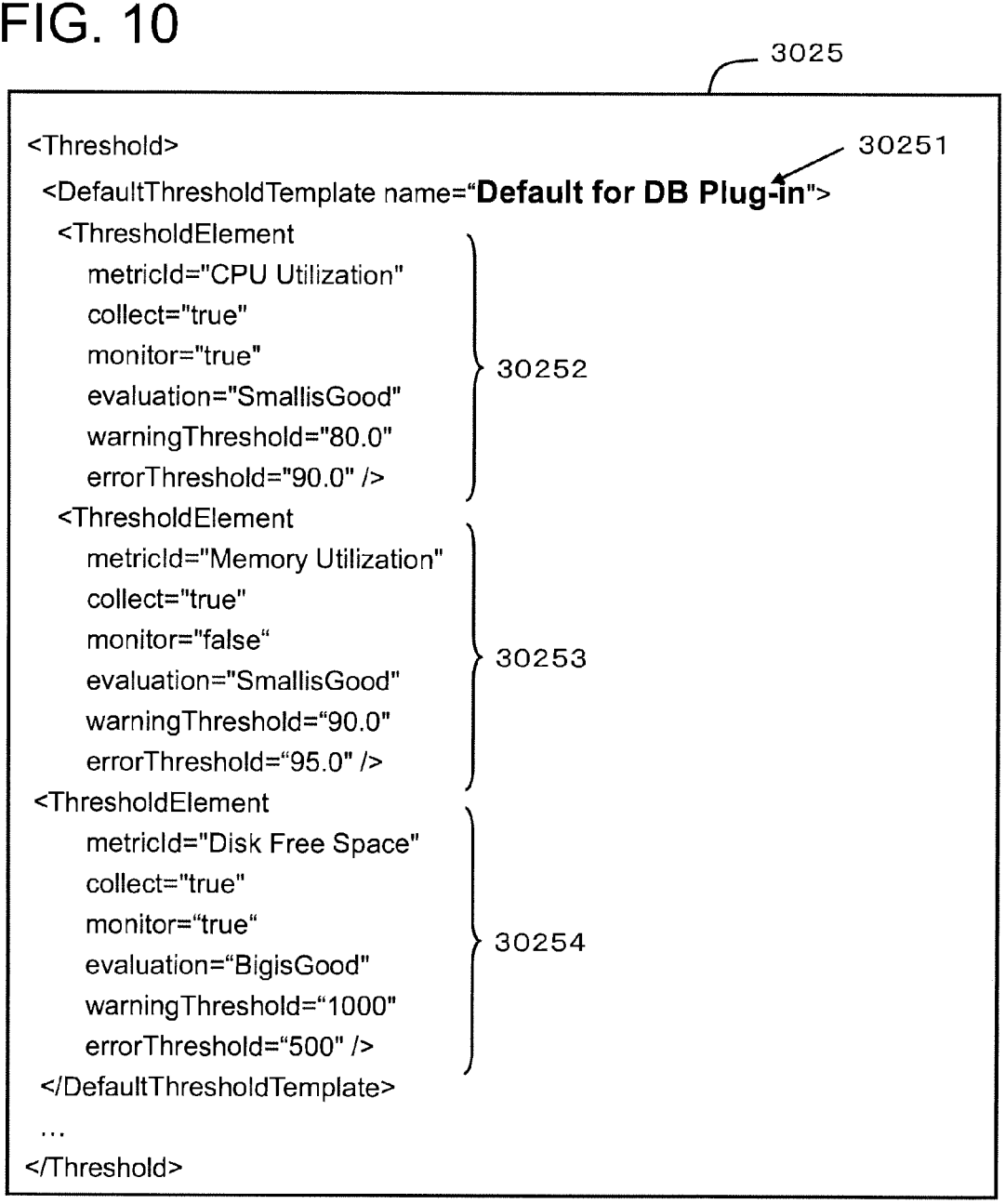
FIG. 10 is a block diagram of template definition information.

FIG. 10 shows an example of the configuration of the template definition information 3025. The template definition information 3025 is defined using XML or another such language the same as the plug-in definition information 3024. The template definition information 3025 lists a template name 30251, and monitoring conditions 30252, 30253, 30254 for each metric included in the template.

For example, the first monitoring condition 30252 lists "CPU Utilization" as the measurement target (monitoring target). "Collect" (collect="true") is configured in the item that specifies whether or not the performance information is to be collected. "Monitor" (monitor="true") is configured in the item that specifies whether or not monitoring is to be performed by comparing the information to the threshold. "Treat a case that is smaller than the threshold as normal" (evaluation="Small is Good") is configured in the item specifying the evaluation method. In addition, 80.0% is configured as the threshold for when a warning is to be output, and 90.0% is configured as the threshold for when an error is to be output.

As used here, "predetermined alert" comprises the warning and the error. The warning is the alert for alerting the user. The error is the alert for notifying the user that a situation more serious than a warning is occurring.

Focus on the second monitoring condition 30253. This monitoring condition 30253 makes "Memory Utilization" the measurement target. In the monitoring condition 30253, performance information is to be collected (collect="true"), but monitoring is not to be carried out (monitor="false"). In monitoring condition 30253, monitoring as to whether or not the status of the memory utilization is normal is not performed, but the evaluation condition (evaluation="Small is Good"), the warning threshold (90.0%) and the error threshold (95.0%) have been set beforehand. Therefore, in the case of a change to monitor="true", an alert will be output when the memory utilization reaches either the warning threshold or the error threshold.

The third monitoring condition 30254 will be explained. In this monitoring condition 30254, "Disk Free Space" is treated as the monitoring target. In the monitoring condition 30254, the disk free space value is collected from the node apparatus (collect="true"), and, in addition, the monitoring is performed by comparing the collected value to the threshold (monitor="true").

In the monitoring condition 30254, the evaluation condition (evaluation="Big is Good") is configured so that a case in which the disk free space exceeds the threshold is determined to be normal, and, in addition, the warning threshold (1000 Mbytes) and the error threshold (500 Mbytes) are configured.

Figure 11:
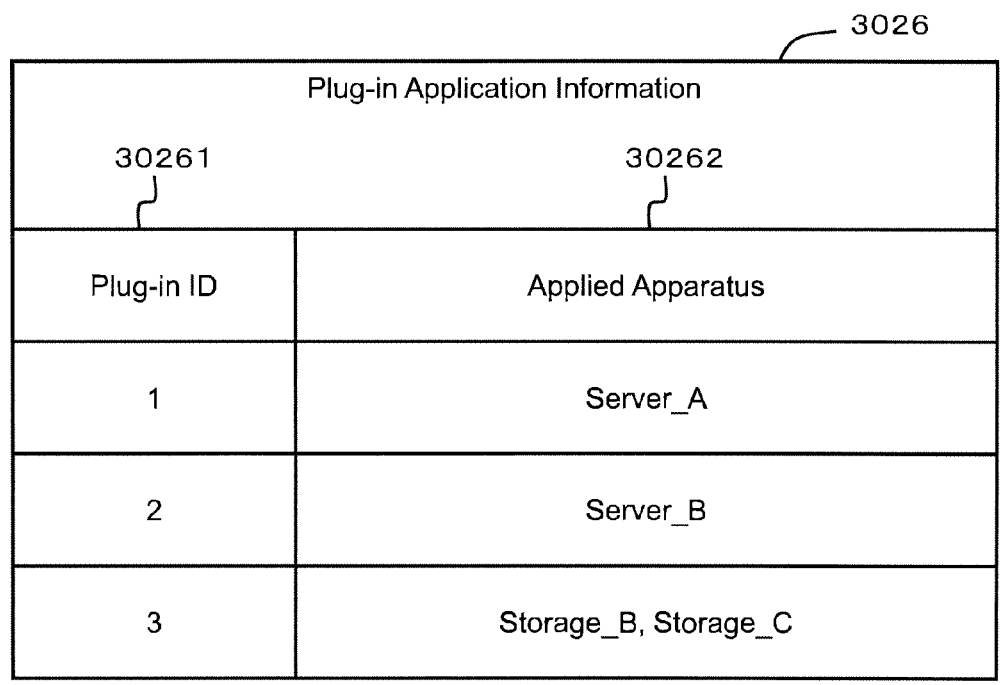
FIG. 11 is a block diagram of plug-in application information.

FIG. 11 shows an example of the plug-in application information 3026. The plug-in application information 3026 associates a plug-in ID 30261 for identifying the plug-in definition information 3024 and a node apparatus name 30262 to which the plug-in definition information 3024 is applied. Therefore, referring to the plug-in application information 3026 makes it possible to learn which plug-in definition information is being applied to which node apparatus.

FIG. 12 shows the template application information 3027. The template application information 3027 associates a template ID 30271 for identifying the template definition information 3025 with a node apparatus name 30272 to which the template definition information 3025 is applied. Therefore, referring to the template application information 3027 makes it possible to learn which template definition information 3025 is applied to which node apparatus.

FIG. 13 shows an example of the plugin management information 3028. The plugin management information 3028 associates a plug-in ID 30281 for identifying the plug-in definition information 3024 with a plug-in definition information 3024 plug-in name 30282 and a plug-in definition information 3024 storage destination 30283. Therefore, knowing the plug-in ID makes it possible to learn the storage destinations of the plug-in name and plug-in definition information 3024.

FIG. 14 shows an example of the configuration of the template management information 3029. The template management information 3029 associates a template ID 30291 for identifying the template definition information 3025 with a plug-in ID 30292, a template name 30293, and a template storage destination 30294. Therefore, knowing the template ID makes it possible to learn the plug-in ID corresponding to the template definition information 3025, and the name and storage destination of the template definition information 3025.

Figure 15:
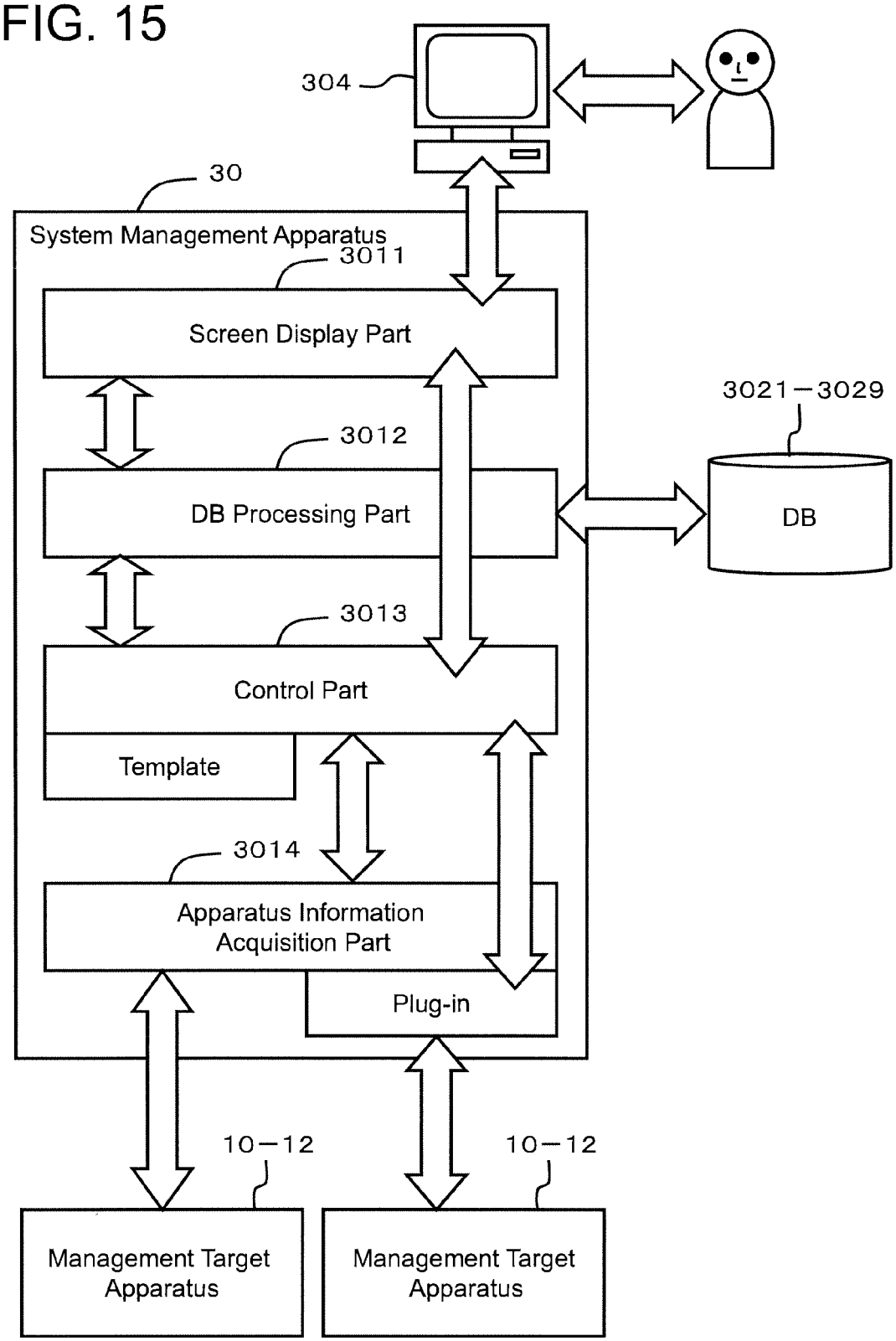
FIG. 15 is a diagram schematically showing the functional configuration of a system management apparatus.

FIG. 15 schematically shows a functional configuration of the system management apparatus 30. The system management apparatus 30, for example, comprises a screen display part 3011, a database processing part 3012, a control part 3013, and an apparatus information acquisition part 3014.

The screen display part 3011 is a function for displaying the management status of each node apparatus on a display device included in the input/output device 304. In addition, the screen display part 3011 receives an instruction or the like from the user via either a touch panel or a keyboard included in the input/output device 304. Therefore, the screen display part 3011 may also be called the user interface part.

The database control part 3012 is in charge of either updating or creating a database requested by the control part 3013, and acquiring data requested by the screen display part 3011.

The control part 3013 processes data transferred from either the screen display part 3011 or the apparatus information acquisition part 3014, and either updates the database (the respective information 3021 through 3029) in accordance with the processing results, or transfers the data to the screen display part 3011. The control part 3013 uses either the initial threshold described in the template definition information 3025 or a user-modified threshold to determine the status of each node apparatus, and notifies the user of the determination result via the screen display part 3011.

The portion depicted in the drawing as "plug-in" is an additional monitoring function that is realized in accordance with the plug-in definition information 3024. The apparatus information acquisition part 3014, as described hereinabove, is able to acquire information (a performance value and/or configuration information) from each node apparatus using two routes. The first route is the route by which the apparatus information acquisition part 3014 acquires information directly from the node apparatus. That is, it is a case in which the apparatus information acquisition part 3014 knows the method for acquiring information from the node apparatus from the beginning. The second route is a method for the apparatus information acquisition part 3014 to acquire information from the node apparatus based on the plug-in definition information 3024. In a case where a new node apparatus has been added to the computer system, and/or a case where it has become possible to acquire new information from a current node apparatus, the plug-in definition information 3024 is used.

Figure 16:
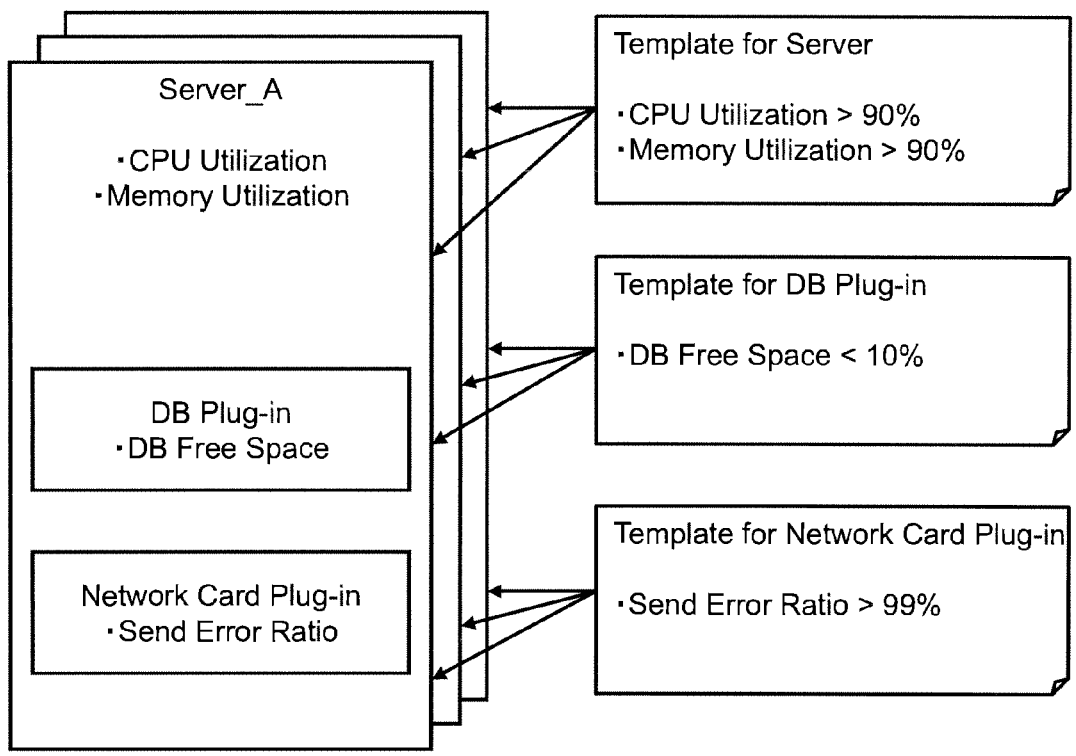
FIG. 16 is a diagram showing how a plurality of templates are associated with a plurality of node apparatuses.

FIG. 16 shows an example of the relationship among node apparatuses, plug-ins and templates. In the example of FIG. 16, a plurality of templates are applied to a plurality of node apparatuses (server A and so forth). The template definition information 3025 may be shortened to template.

The first template is applied to the server computer, and "CPU Utilization >90%" and "Memory Utilization >90%" are configured as the initial thresholds. In the example of FIG. 16, the system management apparatus 30 is able to acquire the CPU utilization and the memory utilization from the server computer without using the plug-in.

The second template is applied to a database by way of a database plug-in (plug-in definition information), and "DB Free Space <10%" is configured as the initial threshold. The third template is applied to a network card by way of a network card plug-in, and "Packet Send Error Ratio>99%" is configured as the initial threshold.

The second template is delivered to the system management apparatus 30 from the plug-in distribution apparatus 20 together with the database plug-in. The third template is also delivered to the system management apparatus 30 from the plug-in distribution apparatus 20 together with the network card plug-in.

Therefore, the user need not be concerned about the monitoring threshold setting in a case where the plug-in is applied to the system management apparatus 30. This is because the initial values are configured in the template (template definition information) beforehand. Therefore, the user is able to monitor either a new node apparatus or a new component by tentatively using the initial thresholds list in the template.

Figure 17:
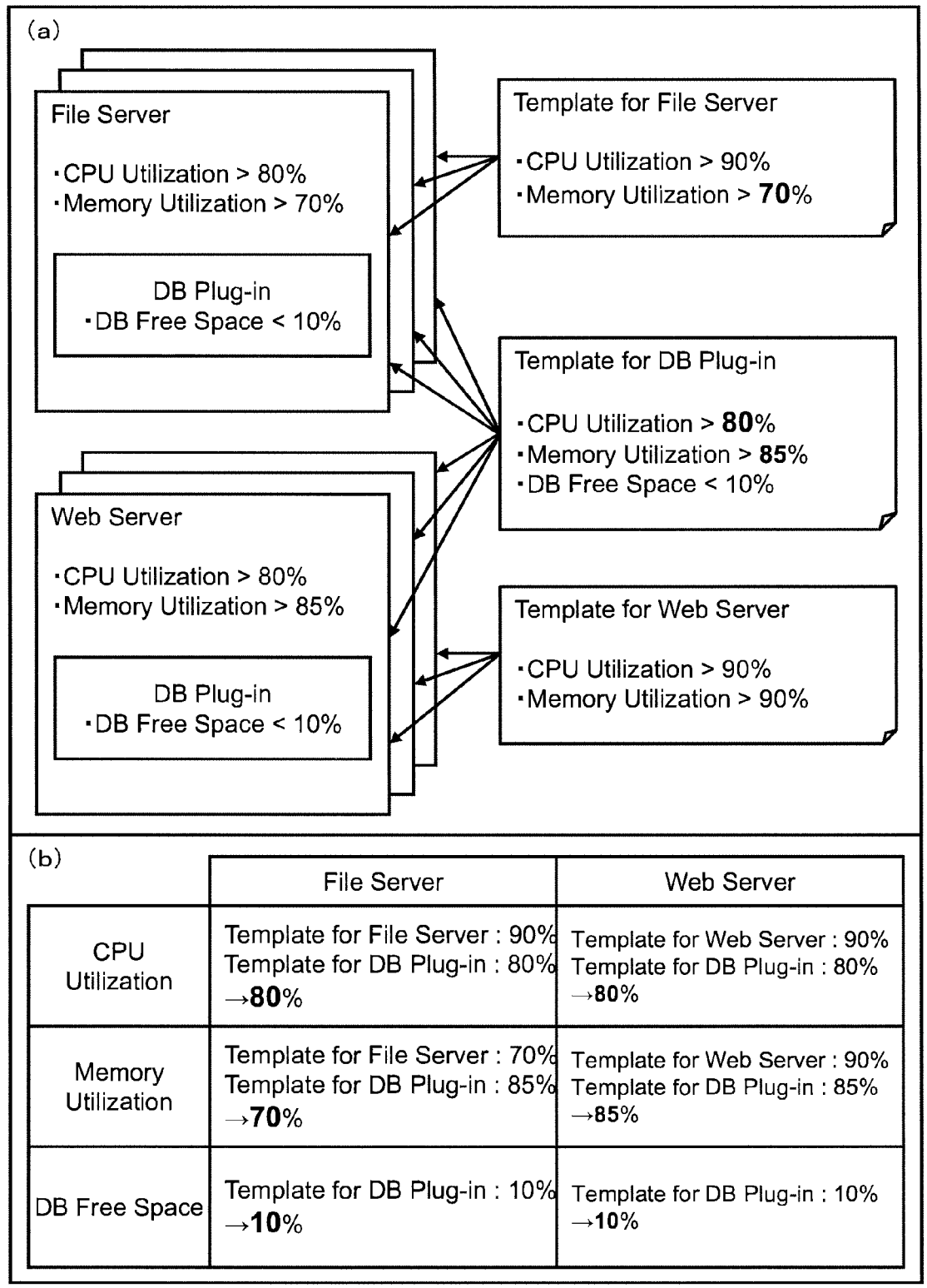
FIG. 17 shows a processing method in a case where a plurality of thresholds compete for a single measurement target (metric).

A processing method in a case where a plurality of thresholds compete with respect to a single management target will be explained by referring to FIG. 17. As shown in FIG. 17(a), two templates are applied to a fileserver, one being a fileserver template and the other a template corresponding to a database plug-in. Two templates are also applied to a web server, one being a web server template and the other a template corresponding to a database plug-in.

CPU utilization and memory utilization thresholds are respectively configured in these three types of templates. "CPU Utilization >90%, Memory Utilization >70%" are configured in the fileserver template. "CPU Utilization >80%, Memory Utilization >85%, DB Free Space <10%" are configured in the template corresponding to the database plug-in. "CPU Utilization >90%, Memory Utilization >90%" are configured in the web server template.

As shown in FIG. 17(b), two different thresholds compete with respect to the CPU utilization and the memory utilization of the two management targets. Accordingly, in this example, in a case where a plurality of thresholds of the same type compete, the threshold having the highest likelihood of an alarm being output is selected. That is, the threshold is selected from the standpoint of a failsafe. As one example, since the two thresholds of 90% (the fileserver template) and 80% (the template corresponding to the database plug-in) compete with respect to the fileserver CPU utilization, the system management apparatus 30 selects the 80%. In accordance with this, an alert is output when the CPU utilization exceeds 80%.

Figure 18:
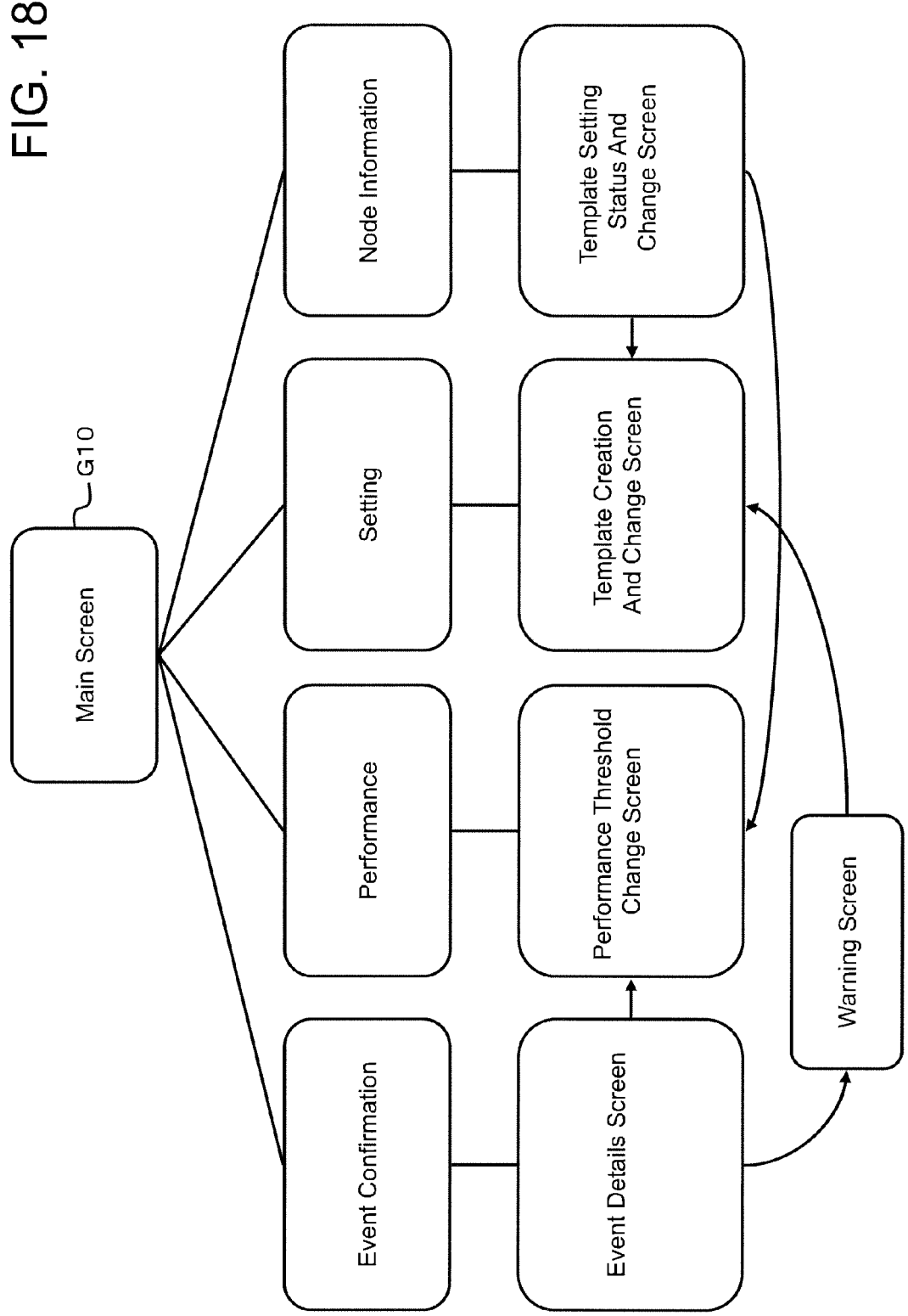
FIG. 18 shows the transition of screens provided by the system management apparatus.

FIG. 18 shows the relationship of the respective screens provided by the system management apparatus 30. The system management apparatus 30 provides the user with a main screen G10. The user is able to select a desired menu from among either "event confirmation", "performance", "setting", or "node information", which are provided via the main screen G10. Upon selecting these menus, an "event detail screen", a "performance threshold change screen", a "template creation and change screen", a "template setting status and change screen", and so forth are displayed. In addition, when transitioning from the "event detail screen" to the "create and change template screen", a warning screen is displayed. Furthermore, the configuration of each screen and the transition between respective screens are examples, and the scope of the present invention is not limited to the configuration examples described hereinbelow.

Figure 19:
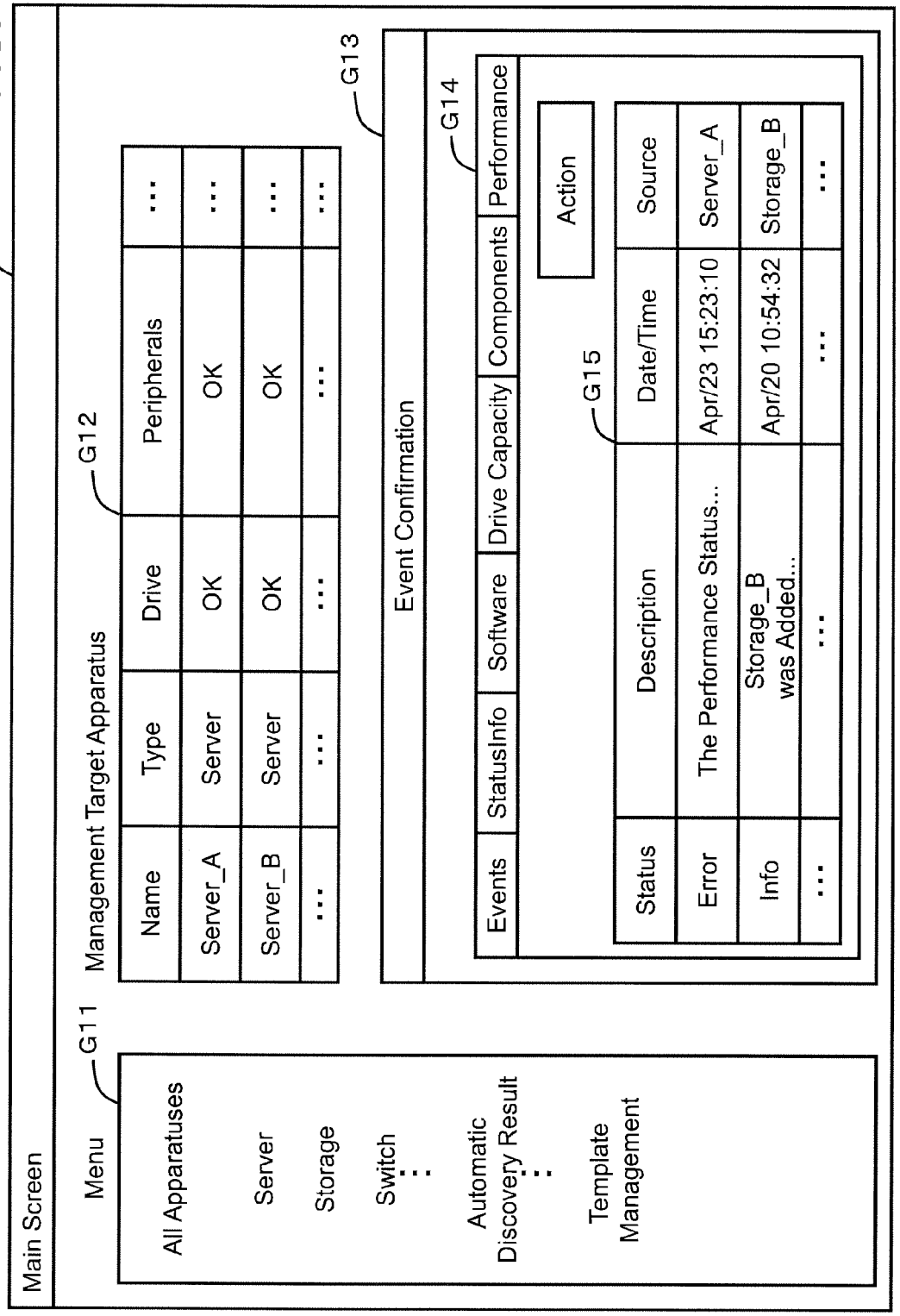
FIG. 19 is a block diagram of a main screen.

FIG. 19 shows an example of the main screen G10. The main screen G10, for example, comprises a menu display part G11, a node apparatus list display part G12, and an event confirmation screen G13.

The menu display part G11, for example, displays a menu for selecting the type of node apparatus to be displayed in the list display part G12, displaying the discovery result of a node apparatus that has been added to the computer system, and managing a template.

For example, when one of the types of apparatuses, i.e. "server", "storage", "switch", or the like displayed in the menu display part G11 is selected, a summary of the selected type of node apparatus is displayed in the list display part G12.

When "automatic discovery result" is selected, the discovery results of the respective node apparatuses included in the computer system are displayed. As one method for automatically discovering a node apparatus, it is possible to (1) use a predetermined protocol and predetermined login information to access the node apparatus comprising each IP address within a range of pre-specified IP addresses, and (2) attempt to acquire predetermined information from the node apparatus.

When "template management" is selected, screen G40 described using FIG. 22 is displayed. The user is able to manage the respective types of templates held in the system management apparatus 30 via the screen G40. Template management, for example, may include creating a new template, changing a current template, and deleting a current template.

For example, the name of each node apparatus, the type of apparatus, and the status of a component (the "drive" and "peripheral equipment" referred to in FIG. 19) are displayed in the list display part G12.

Details of event information are stored in the event confirmation screen G13. The event confirmation screen G13 comprises a tab menu G14 and a display part G15. The tab menu G14, for example, comprises "event details", "status", "software", "drive capacity", "components", and "performance". Information related to the tab menu that is selected from among these tab menus is displayed in the display part G15.

In FIG. 19, "event details" information is displayed in the display part G15. In the table showing the event details, for example, the event status, a description of the event, the event date/time, and the source of the event are displayed.

The event status, for example, includes "warning", "error", "notification" and so forth. In the event description, for example, "performance value has reached threshold", "storage apparatus B added" and other such descriptions are displayed. The data and time at which the event occurred are displayed in the event date/time. The name of the apparatus in which the event occurred is displayed in the event source.

Figure 20:
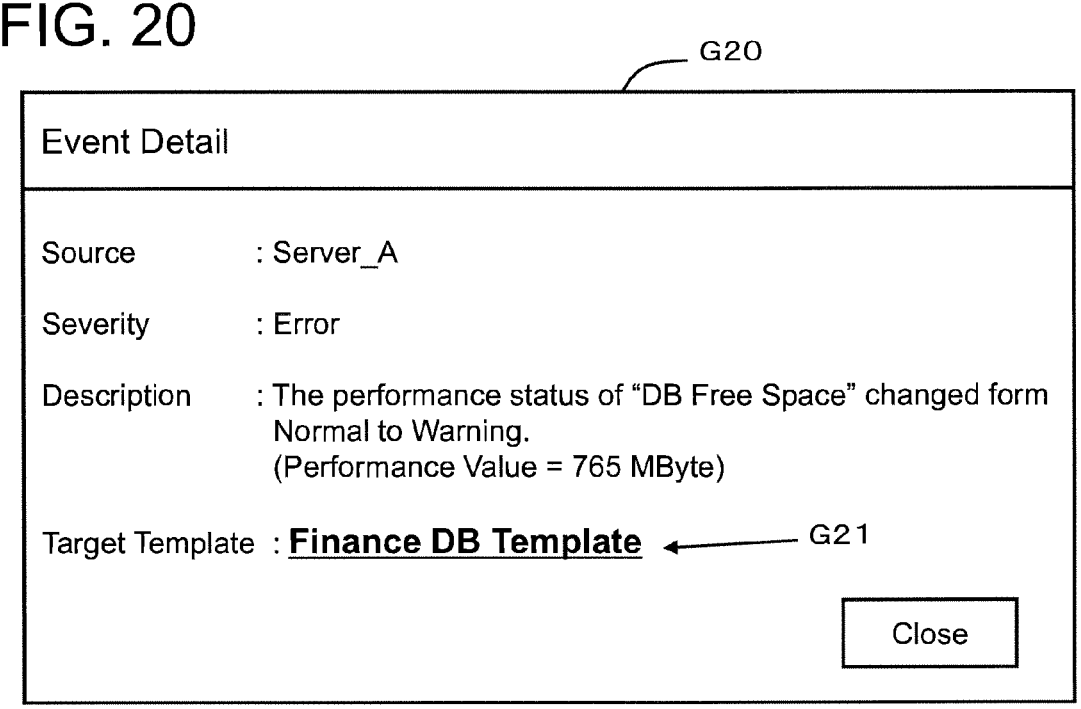
FIG. 20 is a block diagram of an event detail screen.
Figure 23:
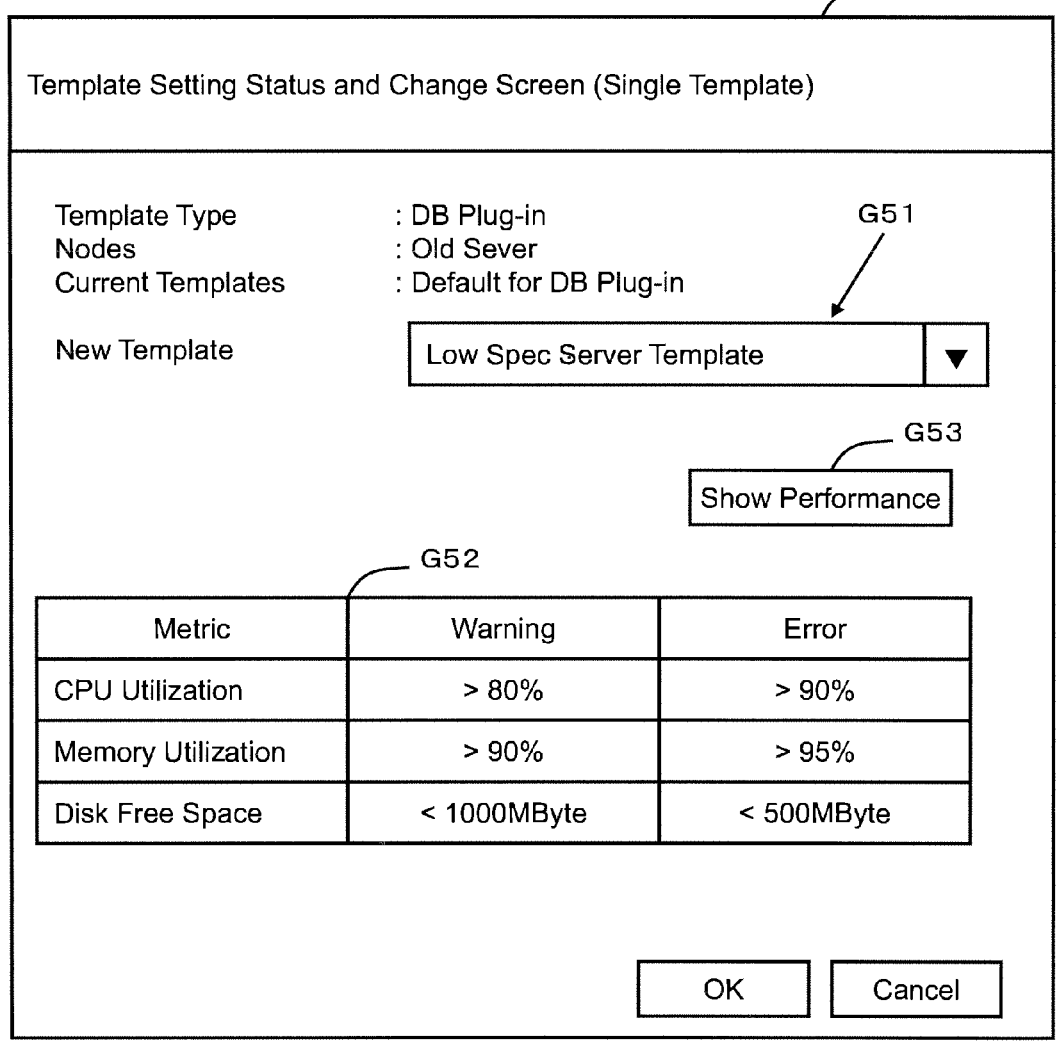
FIG. 23 is a single template setting status and change screen.

When the user selects the tab menu "performance", screens G70 and G80 described in FIGS. 25 and 26 are displayed. When the user either selects the apparatus name displayed in the event source, or operates the "action" button, screens G50 and G60 described in FIGS. 23 and 24 are displayed. When the user selects any of the displayed events, an event detail screen G20 shown in FIG. 20 is displayed.

The event detail screen G20 will be explained by referring to FIG. 20. The event detail screen G20 displays the details of each event. The event source, an event evaluation (type), an event description, and the name of the template used to detect the event are displayed in the event detail screen G20.

Figure 21:
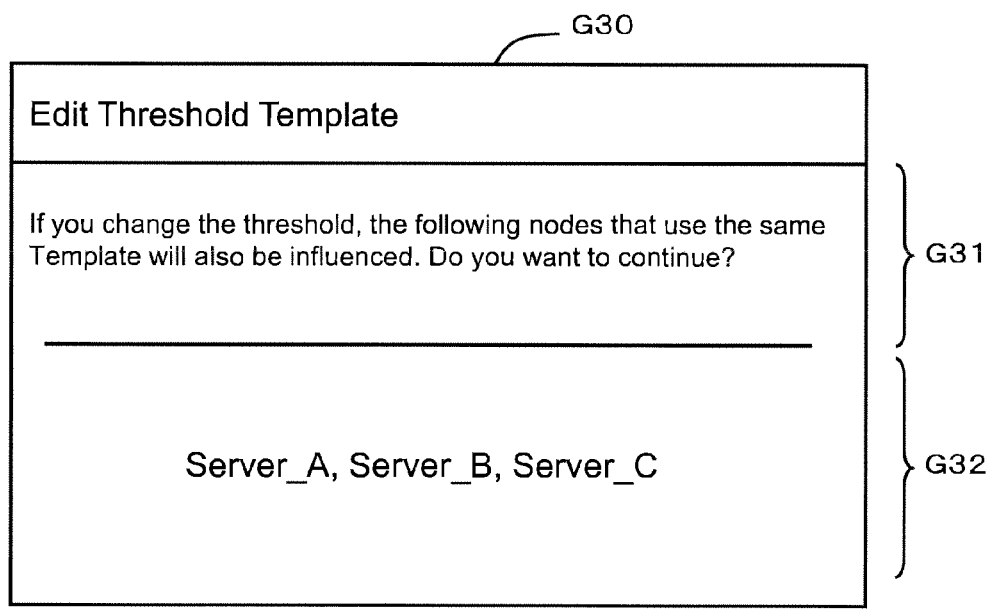
FIG. 21 is a block diagram of a warning screen when a threshold changes.

The user is able to confirm the status of the event details by looking at the event detail screen G20. When the user selects the template name displayed in the screen G20, a warning screen G30, which is shown in FIG. 21, is displayed. When the user confirms the warning screen G30, a template creation and change screen G40, which is shown in FIG. 22, is displayed. Furthermore, the configuration may be such that the warning screen G30 is done away with and there is a direct transition from the screen G20 to the screen G40.

The warning screen G30 will be explained by referring to FIG. 21. The warning screen G30 is displayed when the user attempts to change the threshold defined by a template. A warning G31, which alerts the user about the threshold change, and the name G32 of the node apparatus (management target apparatus) being managed using a common threshold are displayed in the warning screen G30. Therefore, the user is able to check the scope of the effect of a threshold change prior to changing this threshold.

The template creation and change screen G40 will be explained by referring to FIG. 22. This screen G40 is used in a case where a new template is to be created and in a case where a current template is to be changed.

The screen G40, for example, comprises a template selection part G41 for selecting a template, and a threshold setting part G42 for configuring a threshold. In the template selection part G41, the name of the template to be newly created, the template type, and the name of a template to be selected from among the current templates are displayed.

In a case where a new template is to be created, a new name is inputted into the new template name field. The type of plug-in to which this template is applied is configured in the template type field. The name of the current template that is used in the creation of a new template is configured in the current template field. The user is able to use at least a portion of the setting values of the current template to create a new template.

At this point, a template is prepared in accordance with the type of plug-in and the type of node apparatus to which this template is applied. Therefore, template type is a concept that combines a node type and a plug-in type. The template type may also be defined as an attribute of the template, and, in addition, as an attribute that denotes either the type of plug-in or the type of node apparatus that is capable of providing this template.

For example, a management target (measurement target) type (metric type), a condition for issuing a warning, and a condition for generating an error are displayed in the threshold setting part G42.

The screen G50 for displaying the status of a template that is being applied to a node apparatus will be explained by referring to FIG. 23. The template setting status and change screen G50 is for a case where one template is applied to one node apparatus. Furthermore, the screen G60 for a case where a plurality of templates are applied to one node apparatus will be explained using FIG. 24.

The screen G50 of FIG. 23 displays the fact that a "Default for DB Plug-in" template, which is a "DB Plug-in" type template, is applied to a server computer with the node name "Old Server". In a case where a new template is to be applied to this node apparatus, the user utilizes a selection part G51 to select a new template. This makes it possible to apply the new template created using screen G40 shown in FIG. 22 to the node apparatus.

A threshold display part G52 displays either the template threshold that is currently being applied, or the threshold of the template ("Low Spec Server Template") to be newly applied subsequent to this.

Furthermore, when the user operates a button G53 for displaying chronological changes in the performance value, the processing switches to the screens G70 and G80 shown in FIGS. 25 and 26. These screens G70 and G80 will be described below.

The template setting status and change screen G60 will be explained by referring to FIG. 24 using a case in which a plurality of templates are configured for one node apparatus. The screen G60, for example, comprises a template display part G61 and a threshold display part G62.

The template display part G61 displays a template type, a current template name, and a new template name for each template that is applied to this node apparatus ("server_A" in the example of FIG. 24).

In FIG. 24, three templates are being applied to one node apparatus. When the user selects any one of the respective templates, the threshold configured in this selected template is displayed in the threshold display part G62.

The user is able to change either a portion of the templates or all of the templates of the plurality of current templates applied to the one node apparatus to new templates. The user is able to change the template to be applied to the node apparatus by selecting the desired new template.

The threshold setting screen G70 will be explained by referring to FIG. 25. The threshold setting screen G70 comprises a metric selection part G71 and a graphical display part G72. The metric selection part G71 is for selecting a measurement target to be graphically displayed from among a plurality of measurement targets included in the template.

The graphical display part G72 is for simultaneously displaying in an overlapping fashion a threshold and a graph showing chronological changes in the performance value collected from each node apparatus for the plurality of node apparatuses to which a common template is being applied.

In the example of FIG. 25, a graph showing the history of the CPU utilization of server A, a graph showing the history of the CPU utilization of server B, a warning threshold (80%) and an error threshold (90%) are simultaneously displayed in the graphical display part G72.

Therefore, by checking the screen G70 shown in FIG. 25, the user is able to readily consider the extent to which the frequency of warnings and errors changes when a threshold changes. Consequently, the user is able to configure a more appropriate threshold.

The selection, from among a plurality of node apparatuses to which the same template is applied, of a node apparatus for which the performance value history demonstrates a specific movement, will be explained by referring to FIG. 26. For convenience of explanation, the screen G80 shown in FIG. 26 comprises the same configuration as the screen G70 shown in FIG. 25 even though the reference signs in FIGS. 25 and 26 change.

Graphs showing the chronological changes in the performance values of the respective node apparatuses to which the same template is applied are simultaneously displayed in overlapping fashion in a graphical display part G82 for the measurement targets selected in a metric selection part G81.

In the example of FIG. 26, graphs showing the chronological changes of the CPU utilization rates of the server A, the server B and the server C are displayed in the graphical display part G82. In addition, the warning threshold and the error threshold are displayed together with the respective graphs in the graphical display part G82.

Upon comparing the CPU utilization graphs of the server A and the server B to the CPU utilization graph of the server C, the CPU utilization of the server C is higher overall than the CPU utilization rates of the servers A and B. In a case where the warning threshold and error threshold applied to the servers A and B are also applied to the server C, the frequency of warnings and errors will increase. Therefore, numerous events related to the server C will be generated despite the fact that a failure has not occurred.

The respective thresholds can be changed to match the CPU utilization of the server C, but it would not be possible to appropriately monitor the CPU utilization rates of the servers A and B in this case. Accordingly, in this example, the node apparatus that demonstrates the specific change is selected from among the plurality of node apparatuses to which the common template is applied, and a different template is applied to the selected node apparatus. The threshold of the different template is configured to match the node apparatus that demonstrates the specific change. Consequently, the user is able to appropriately manage each of the node apparatuses.

Figure 27:
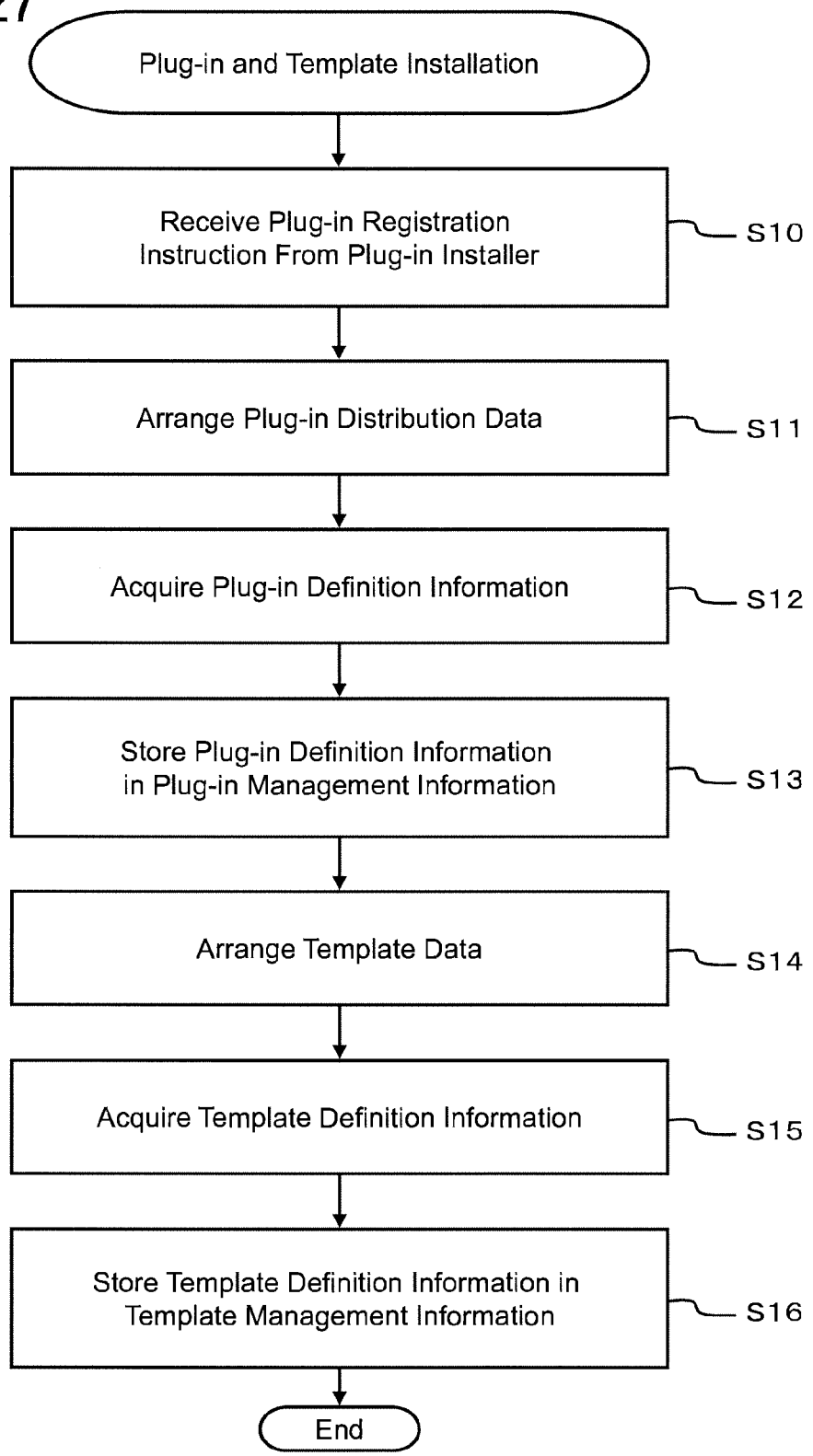
FIG. 27 is a flowchart showing a process for installing a plug-in and a template in the system management apparatus.

Next, the operation of the system management apparatus 30 will be explained by referring to FIGS. 27 through 36. FIG. 27 is a flowchart showing a process for installing plug-in definition information (a plug-in) and template definition information (a template) in the system management apparatus 30. Furthermore, the respective flowcharts described hereinbelow show overviews of respective processes. A so-called person with ordinary skill in the art should be able to either change or delete a portion of the steps shown in the drawings, and to add a new step.

The system management apparatus 30, upon receiving a plug-in registration instruction from a plug-in installer (S10), stores the plug-in definition information 20221 in the memory 302 (S11). The system management apparatus 30 acquires the plug-in definition information 3024 from the plug-in definition information 20221 (S12), and stores this plug-in definition information 3024 in the plug-in management information 3028 (S13).

Similarly, the system management apparatus 30 stores the template definition information 20222 in the memory 302 (S14), and acquires the template definition information 3025 from this template definition information 20222 (S15). The system management apparatus 30 stores the acquired template definition information 3025 in the template management information 3029 (S16).

As described hereinabove, upon receiving the plug-in distribution data 2022 from the plug-in distribution apparatus 20, the system management apparatus 30 boots up the plug-in installer. In accordance with this, the plug-in definition information 3024 and the template definition information 3025 are installed in the system management apparatus 30.

Figure 28:
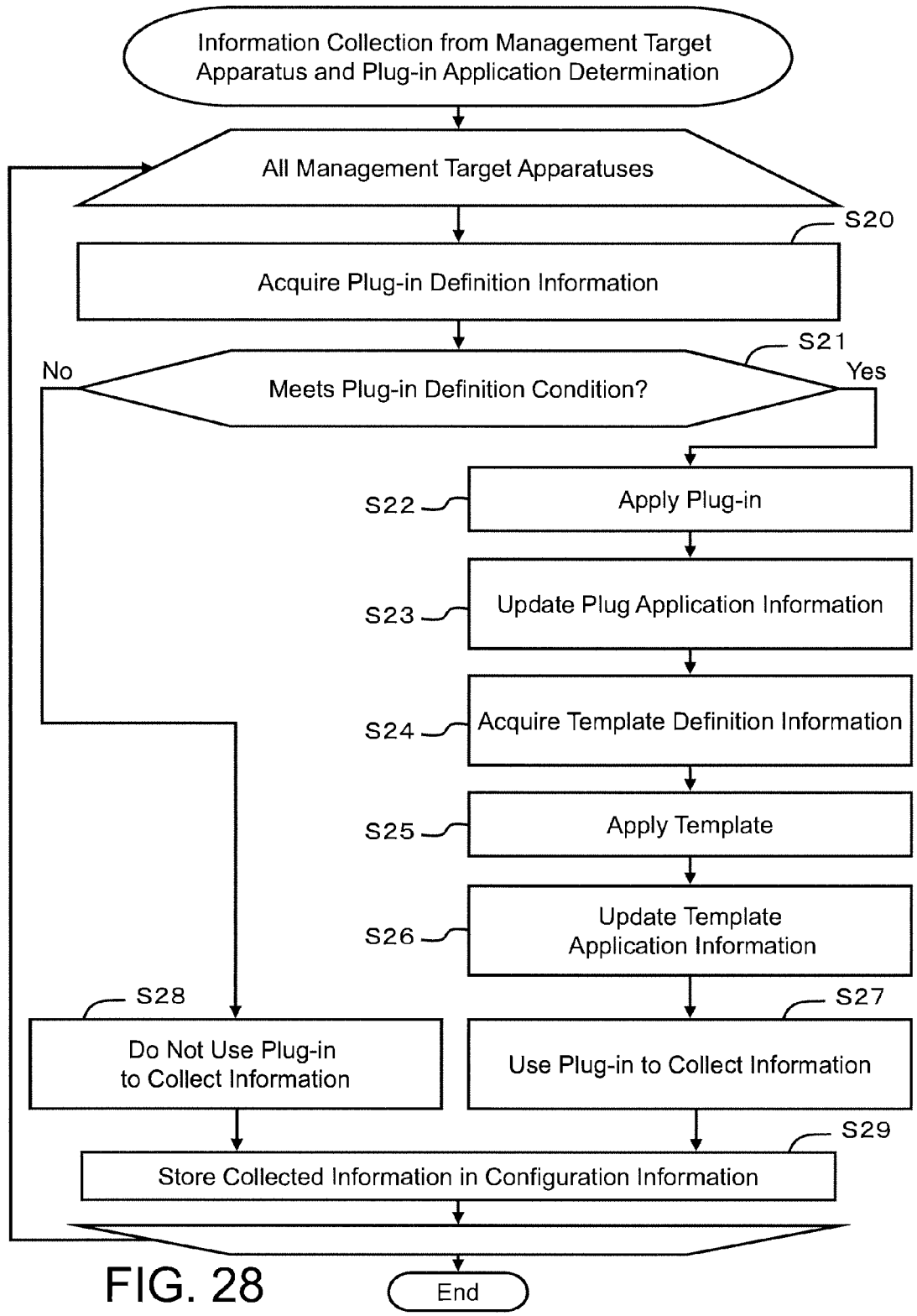
FIG. 28 is a flowchart showing a process for collecting information from a node apparatus.

FIG. 28 shows a process for acquiring information from each management target node apparatus. This process is executed when an instruction is received to collect information from the respective nose apparatuses. Either the steps S20, S21, S28 and S29 described below, or any of the steps S20 through S27 and S29 are executed for all of the node apparatuses. A processing target node apparatus will be called a target apparatus here.

The system management apparatus 30 acquires the plug-in definition information 3024 from the plug-in management information 3028 (S20), and determines whether or not the target apparatus meets the plug-in definition condition (S21).

In a case where the target apparatus meets the plug-in definition condition (S21: YES), the system management apparatus 30 applies the plug-in definition information 3024 to the target apparatus (S22), and updates the plug-in application information 3026 (S23).

Next, the system management apparatus 30 acquires the template definition information 3025 (S24), applies this template definition information 3025 to the target apparatus (S25), and updateS the template application information 3027 (S26).

In accordance with this, the system management apparatus 30 uses the plug-in definition information 3024 to access the target apparatus and acquire the required information from the target apparatus (S27). The acquired information (the target apparatus configuration information) is stored in the configuration information 3021 (S29).

Alternatively, in a case where the target apparatus does not meet the plug-in definition condition (S21: NO), the system management apparatus 30 acquires the information from the target apparatus without using the plug-in definition information 3024 (S28). The acquired information is stored in the configuration information 3021 the same as above (S29).

As described hereinabove, the system management apparatus 30 collects and saves the information from the target apparatus either based on an acquisition method configured at the time the system was constructed, or based on an acquisition method that uses the plug-in definition information 3024.

Figure 29:
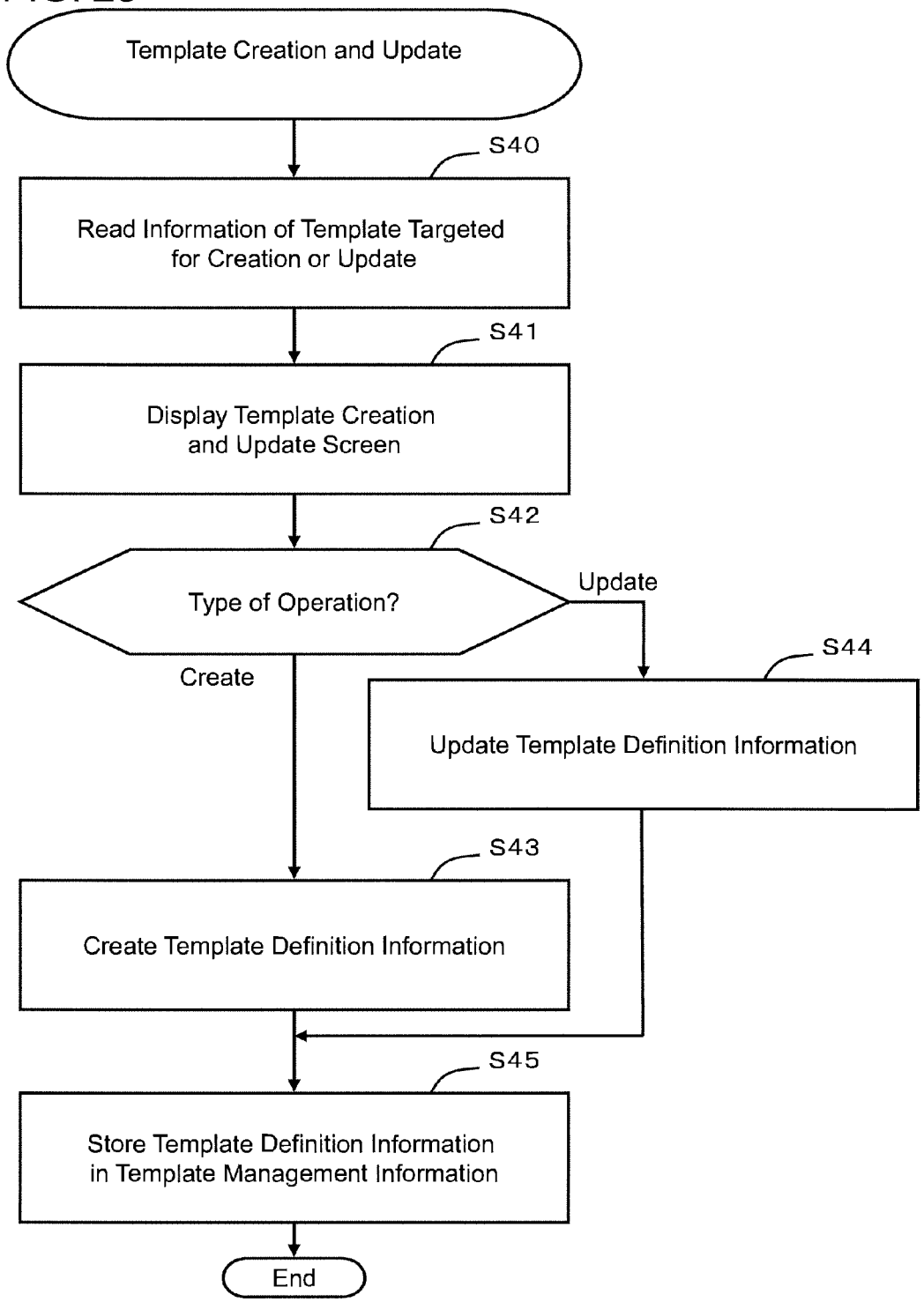
FIG. 29 is a flowchart showing a template creation and update process.

FIG. 29 is a flowchart showing a process for creating and updating a template. This process, for example, corresponds to the screen G40 shown in FIG. 22. This process is executed when either a create template or a change template instruction is received.

The system management apparatus 30 reads the template definition information 3025 that is the target for either creation or change (S40). The system management apparatus 30 displays the screen G40 shown in FIG. 22 (S41), and determines whether the user operation is a "create new template" or a "change template setting" (S42). For example, in a case where a new name has been inputted to the new template name field, it is possible to determine that it is a "create new template".

When creating a new template, the system management apparatus 30 creates new template definition information 3025 in accordance with a value that the user inputs to the screen (S43). The new template definition information 3025 is stored in the template management information 3029 (S45).

Alternatively, in the case of a template change (a case of a template revision), the system management apparatus 30 updates the template definition information 3025 using the value that the user input to the screen (S44). This template management information 3205 is stored in the template management information 3029 (S45).

Figure 30:
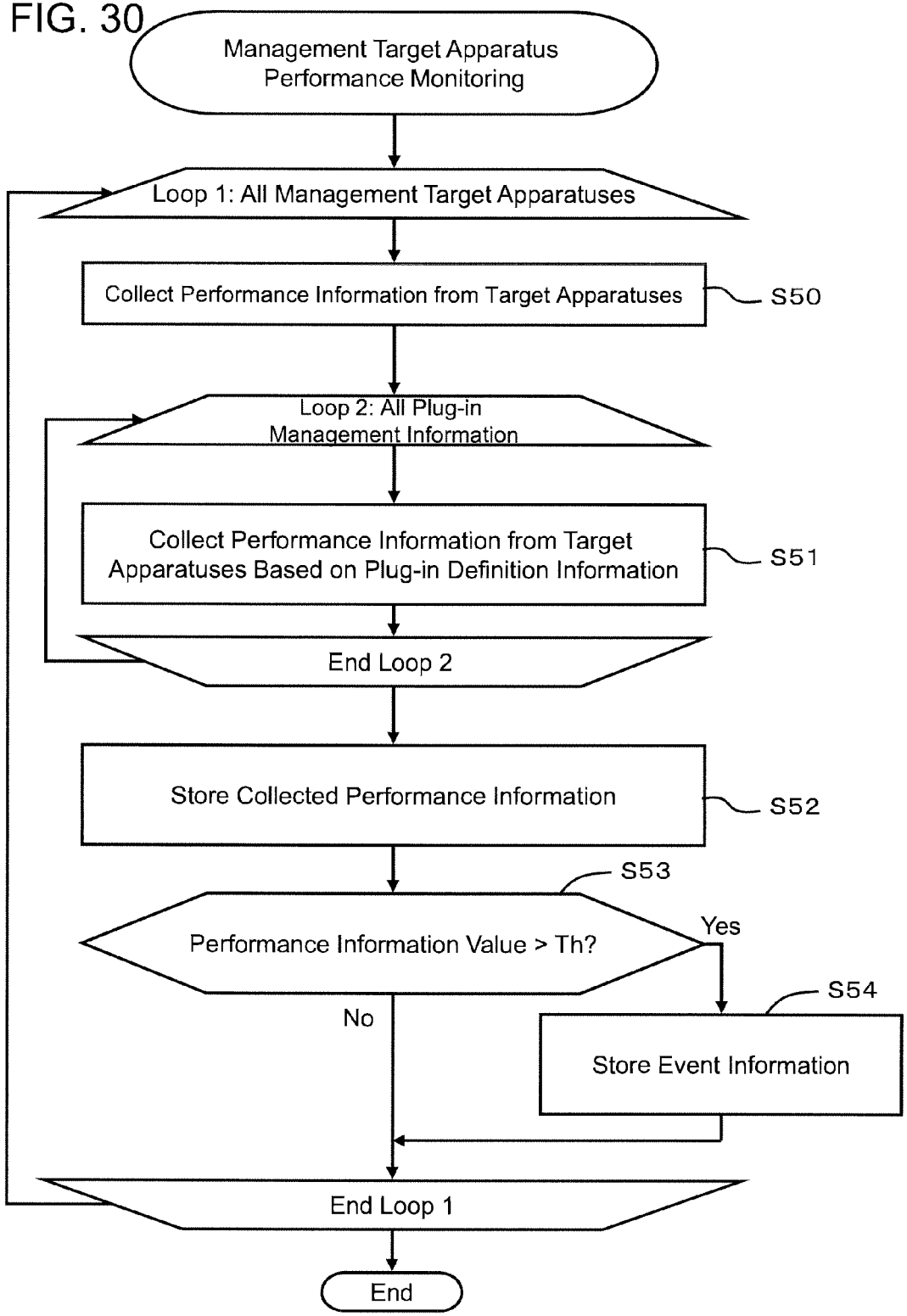
FIG. 30 is a flowchart showing a process for monitoring the performance of a node apparatus.

FIG. 30 is a flowchart showing a process for monitoring the performance of a node apparatus. In loop 1, the below-described S50, S51, S52, S53, and S54 are executed for all of the node apparatuses.

The system management apparatus 30 attempts to collect information from the target apparatus in accordance with a default information acquisition method configured when the system was constructed (S50). In the case of an apparatus or a component that has existed since the time the system was constructed, it is possible to acquire the performance information using the default information acquisition method.

Alternatively, in a case where the target apparatus is an apparatus or a component, which has not existed since the time when the system was constructed, but rather was added thereafter, the system management apparatus 30 is not able to acquire the performance information from the target apparatus using the default information acquisition method.

Accordingly, loop 2 is executed. In loop 2, the system management apparatus 30 acquires the performance information from the target apparatus by trying all the plug-in definition information 3024 that is registered in the plug-in management information 3028 in order (S51). Furthermore, the configuration may also be such that a corresponding relationship between an IP address and the plug-in definition information 3024 is configured beforehand, and the plug-in definition information 3024 to be tried on the target apparatus is selected in accordance with this target apparatus IP address.

The system management apparatus 30 stores the performance information collected from the target apparatus (S52), and compares the value of this performance information to the threshold applied to the target apparatus (S53). In a case where the performance information value reaches the threshold (S53: YES), the system management apparatus 30 determines that an event has occurred, and stores the event information in the event information 3023 (S54). Furthermore, for convenience sake, S53 of FIG. 30 makes it look like a determination is made as to whether or not the performance information value exceeds the threshold Th. However, as described hereinabove, the event generation condition (the monitoring condition) will change in accordance with the metric type. For example, when monitoring the memory free space, an event will occur in a case where the performance information value is less than the threshold Th.

In a case where the performance information value does not reach the threshold (S53: NO), the system management apparatus 30 return to S50.

Figure 31:
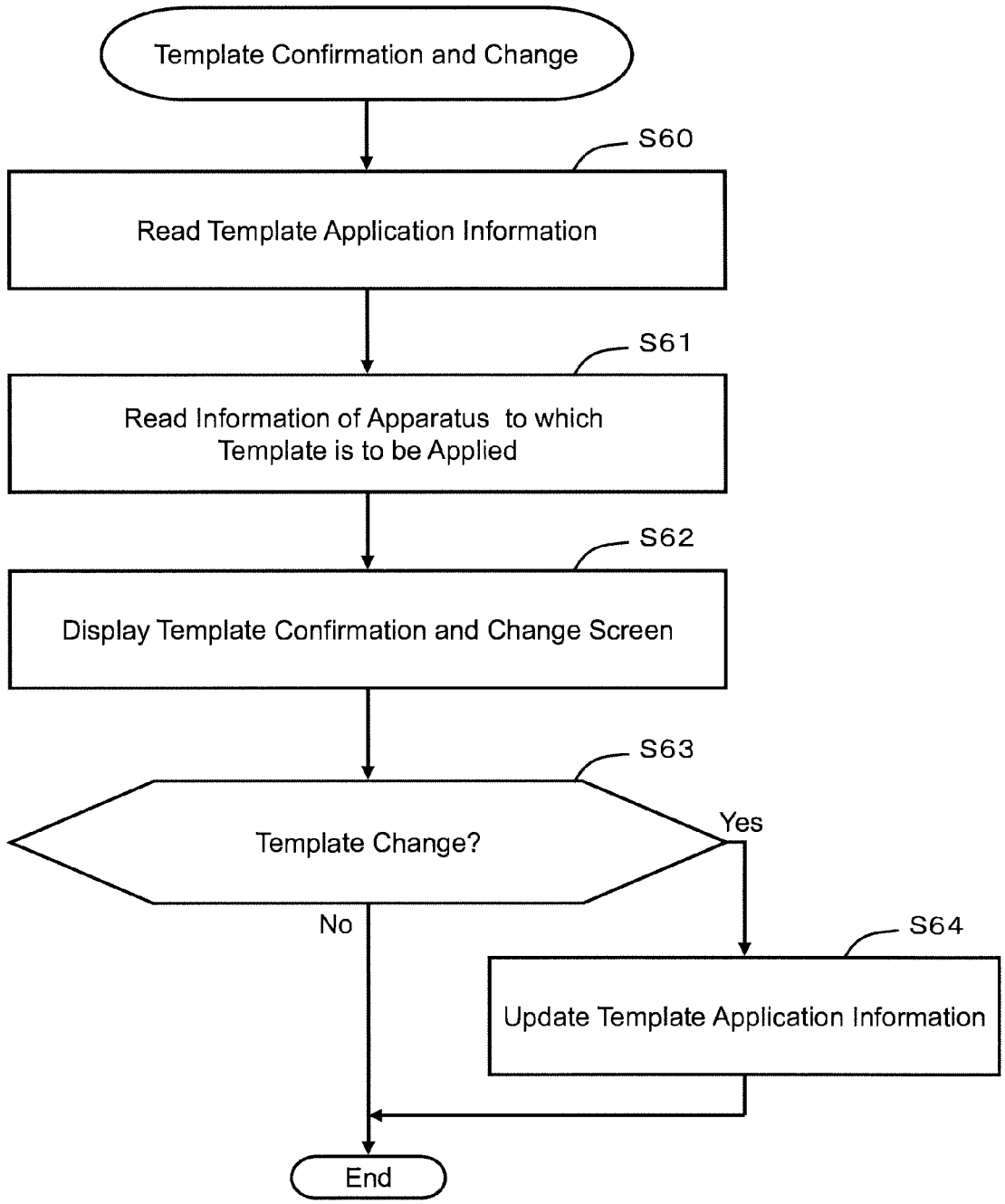
FIG. 31 is a flowchart showing a template confirmation and change process.

FIG. 31 is a flowchart of a process for confirming and changing a template. This process is executed when the corresponding relationship between the node apparatus and the template definition information 3025 changes.

The system management apparatus 30 reads the template application information 3027 (S60) and acquires the information (the apparatus name) of the target apparatus to which the template definition information 3025 is applied (S61).

The system management apparatus 30 displays either of the screen G50 shown in FIG. 23 or the screen G60 shown in FIG. 24 (S62). The system management apparatus 30 determines whether or not the template that is applied to the target apparatus has been changed by the user (S63). In a case where the template has been changed (S63: YES), the system management apparatus 30 updates the template application information 3027 (S64) and ends the processing. In a case where the template has not been changed (S63: NO), this processing ends normally.

Figure 32:
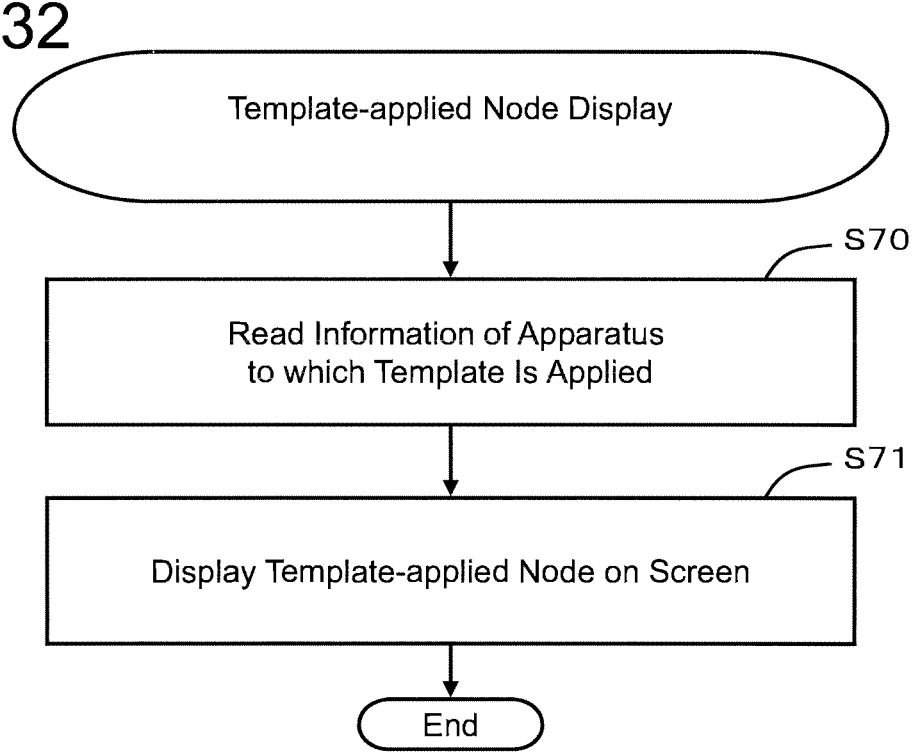
FIG. 32 is a flowchart showing a process for displaying on a screen a plurality of node apparatuses to which the same template is applied.

FIG. 32 is a flowchart showing a process for displaying all the node apparatuses to which the same template is applied. This process is executed when creating the warning screen G30 shown in FIG. 21.

The system management apparatus 30 reads the name of the node apparatus to which the processing target template definition information 3025 (target template) is applied from the template application information 3027 (S70). The system management apparatus 30 displays the name of each node apparatus to which the target template is applied on the screen (S71).

Figure 33:
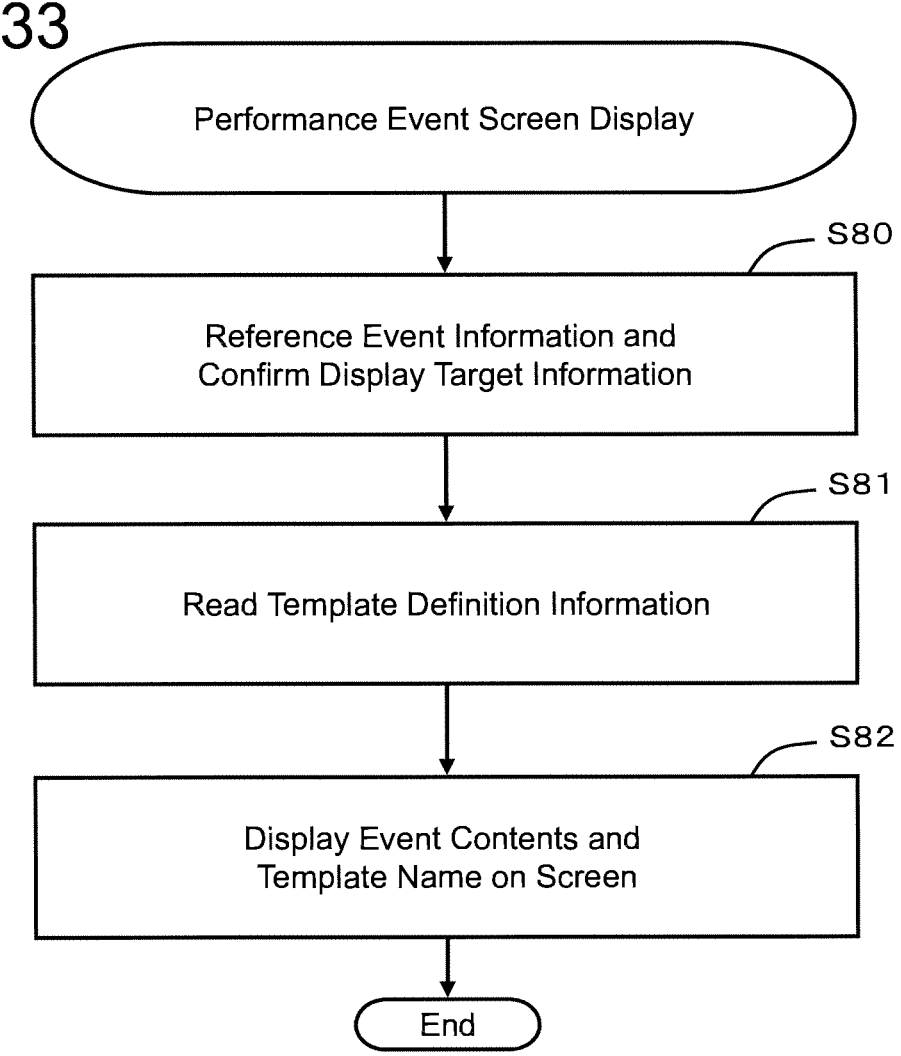
FIG. 33 is a flowchart showing a process for displaying on a screen an event related to the performance of a node apparatus.

FIG. 33 is a flowchart showing a process for displaying a performance information-related event on the screen. This process is executed in relation to the screen G20 shown in FIG. 20.

The system management apparatus 30 confirms information related to a display target event based on the event information 3023 (S80). The system management apparatus 30 reads the template information (name and so forth) corresponding to the display target event from the template management information 3029 (S81). The system management apparatus 30 displays the display target event-related information of the event information and template definition information on the screen (S82).

Figure 34:
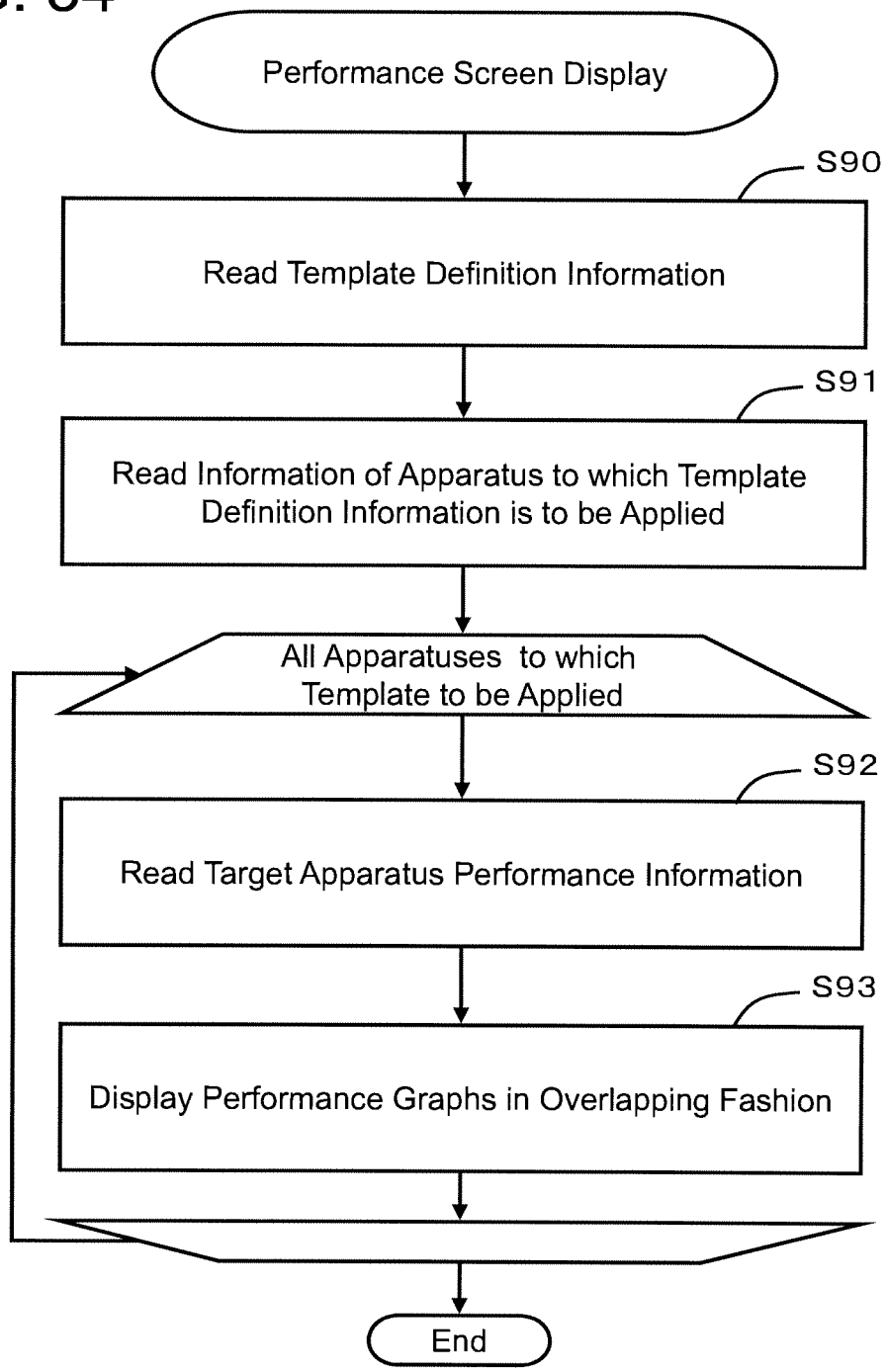
FIG. 34 is a flowchart showing a process for graphically displaying a plurality of performance histories on a screen in an overlapping fashion.

FIG. 34 is a flowchart showing a process for displaying a performance information value change on a screen. This process is executed in relation to either the screen G70 shown in FIG. 25 or the screen G80 shown in FIG. 26.

The system management apparatus 30 reads the template definition information 3025 corresponding to the display target performance value from the template management information 3029 (S90), and next, reads the information (apparatus name) of the node apparatus to which this template definition information 3025 is applied from the template application information 3027 (S91).

The system management apparatus 30 executes S92 and S93 for each apparatus read in S91. The system management apparatus 30 reads the performance value of the display target apparatus from the performance information 3022 (S92), and plots a graph showing the chronological changes in this performance value on the screen (S93).

The graphs for each of the respective target apparatuses are displayed on the screen at the same time. The type of line and/or color of each graph is/are configured to enhance the identifiability of the respective graphs.

Figure 35:
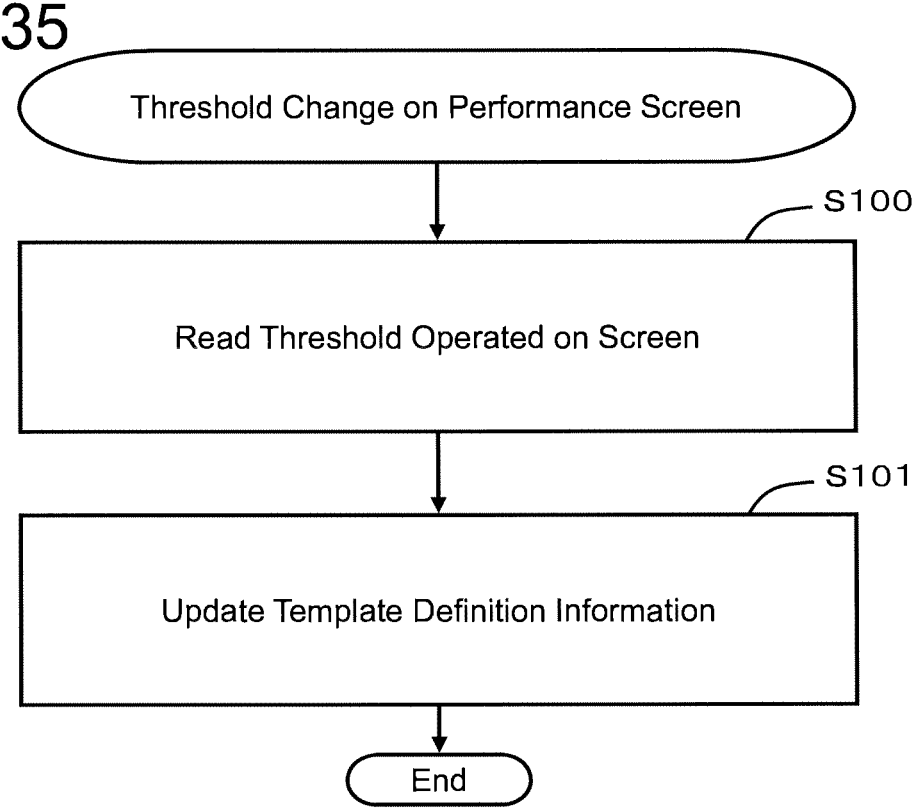
FIG. 35 is a flowchart showing a process for changing a threshold on a screen on which performance is graphically displayed.

FIG. 35 is a flowchart showing a process for changing a threshold on a screen displaying a performance value. As shown in FIGS. 25 and 26, warning thresholds and error thresholds are displayed together with the performance value graphs in screens G70 and G80. The user is able to change a threshold by selecting the horizontal line indicating the threshold and moving it up or down. Being able to change a threshold in a graph makes it possible for the user to readily estimate a change in the frequency of events in accordance with the threshold change. The horizontal line indicating the threshold will be called the threshold line here.

When the threshold line is operated, the system management apparatus 30 reads the post-operation threshold from the screen (S100), and updates the template definition information 3025 (S101).

Figure 36:
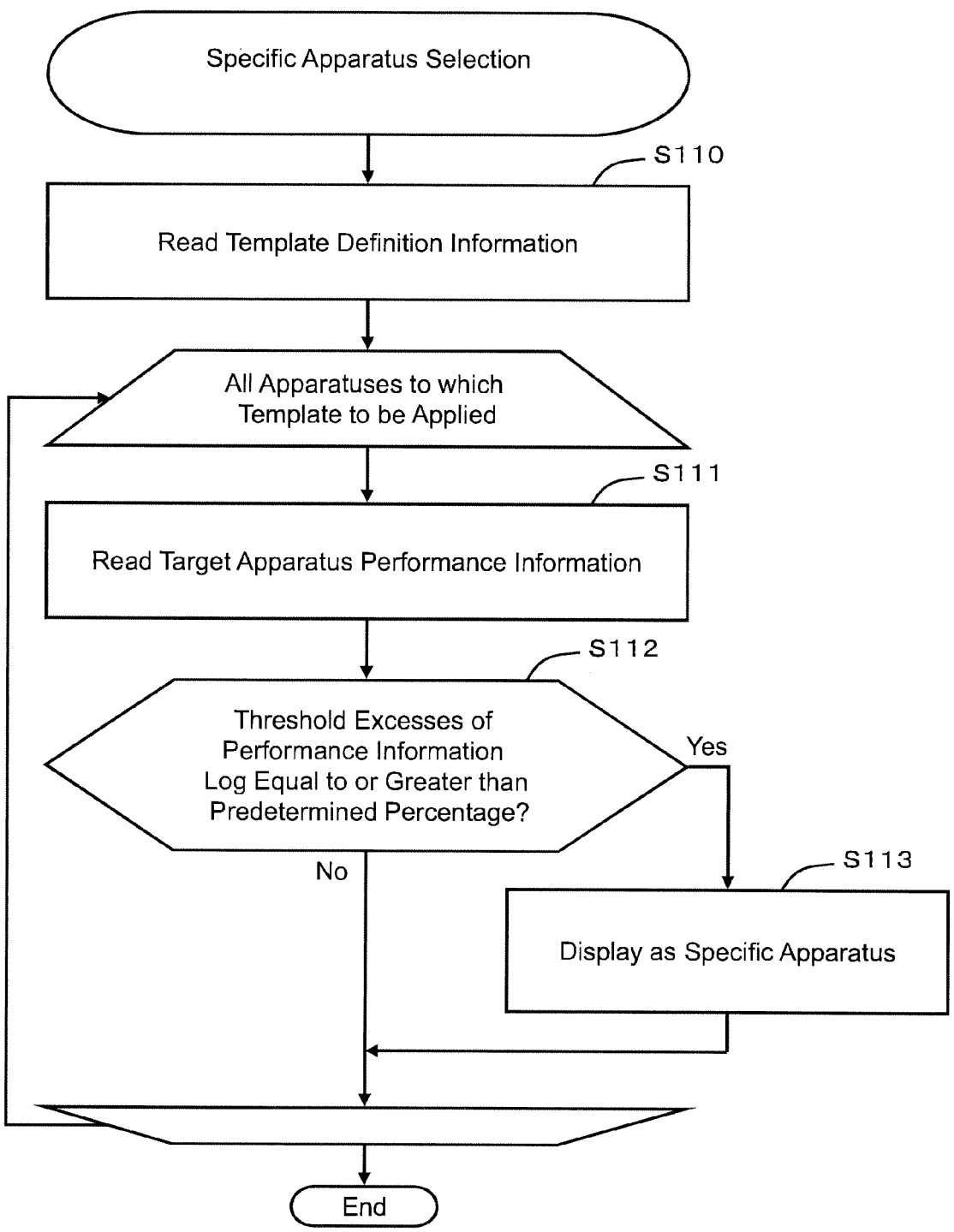
FIG. 36 is a flowchart of a process for selecting and displaying a specific performance history that is far removed from another performance history.

FIG. 36 is a flowchart showing a process for selecting an apparatus (hereinafter, the specific apparatus) whose performance value history demonstrates a specific behavior. This process is executed in relation to the screen G80 shown in FIG. 23.

The system management apparatus 30 reads the template definition information 3025 (S110) and executes the following steps for all the node apparatuses to which this template definition information 3025 is applied.

The system management apparatus 30 reads the history of the values of the target apparatus performance information from the performance information 3022 (S111). The system management apparatus 30 determines whether or not the frequency with which the history of this performance information value exceeds the thresholds (the warning threshold and the error threshold) is equal to or greater than a predetermined percentage (S112).

The frequency with which the history of this performance information value exceeds the thresholds signifies the frequency with which this history meets the generation condition for either the warning or the error. There may be cases in which an alert is outputted when the performance information value exceeds the threshold, and case in which an alert is outputted when the performance information value falls below the threshold.

In a case where the frequency with which the performance information value exceeds the threshold is equal to or greater than a predetermined percentage (S112: YES), the system management apparatus 30 determines that this target apparatus is a specific apparatus, and displays this target apparatus on the screen (S113). For example, it changes the performance graph of the specific apparatus to a special color and/or causes it to blink, and, in addition, displays a message on the screen to the effect "server C is demonstrating performance value changes far removed from those of the other servers A and B to which the same template is applied. Please prepare a new template for server C".

Configuring this example like this delivers the plug-in definition information together with the template definition information to the system management apparatus 30, thereby enabling management to be performed using a relatively appropriate threshold even in a case where a new node apparatus has been added. Therefore, user convenience is enhanced, and, in addition, system management performance is also enhanced.

In this example, in a case where the threshold inside the template definition information changes, all the node apparatuses to which this template definition information is applied are displayed. Therefore, the user is able to easily learn the scope of the threshold change impact. Consequently, user convenience is enhanced.

In this example, when an event occurs, information (a template name) for identifying the template definition information corresponding to this event is associated with this event and displayed on a screen. Therefore, even in a case where a plurality of template definition information are being applied to one node apparatus, the user is able to rapidly confirm which template the event relates to. Consequently, user convenience is enhanced.

In this example, all of the templates and thresholds applied to a node apparatus can be displayed on a screen. Therefore, the user can easily confirm the template and threshold that is applied to each node apparatus. Consequently, user convenience is enhanced.

In this example, a specific apparatus, which demonstrates changes in performance values that are different from those of the other node apparatuses to which the same template is applied, is selected, and the existence of the specific apparatus is displayed on the screen. Therefore, the user is able to create a new template for the specific apparatus, making it possible to perform appropriate management that is tailored to the realities of the respective node apparatuses. Consequently, the user convenience is enhanced.

The preferred embodiment of the present invention has been described above, but this embodiment is an example used to explain the present invention, and does not purport to limit the scope of the present invention solely to this embodiment. The present invention can also be put into practice in various other modes as well.

REFERENCE SIGNS LIST

10 Server computer
11 Storage apparatus
12 Network apparatus
20 Plug-in distribution apparatus
30 System management apparatus

The invention claimed is:
1. A management system comprising:
  a communication interface configured to couple with a plurality of management target apparatuses;
  a memory configured to store:
  (A) at least a management program;
  (B) added component information which corresponds to a certain management target apparatus and describes either a procedure or a setting for acquiring management information from the certain management target apparatus, and
  (C) management setting information describing typical values of modifiable settings for monitoring the management information acquired by the added component information, and
  a microprocessor configured, in accordance with executing the management program,
  (1) to respectively receive delivery added component information for obtaining the added component information to be stored in the memory, and delivery management setting information for obtaining the management setting information to be stored in the memory, and to store the added component information and the management setting information in the memory using the delivery added component information and the delivery management setting information,
  (2) to use the added component information stored in the memory to acquire the management information from the certain management target apparatus, and
  (3) to manage the certain management target apparatus based on the acquired management information and the management setting information stored in the memory.
2. The management system according to claim 1,
wherein the management setting information comprises a threshold for determining a status of the management information as at least one of the typical values of modifiable settings, and
in a case where the management information has reached the threshold, the microprocessor is configured to correspondingly output a certain alert and identification information for identifying the management setting information related to the certain alert.
3. The management system according to claim 2,
wherein the microprocessor, in a case where the management setting information is associated with a plurality of the certain management target apparatuses, is configured to output information denoting the plurality of the certain management target apparatuses when the threshold changes.
4. The management system according to claim 3,
wherein the microprocessor, in a case where the threshold included in the management setting information changes, is configured to display the threshold and graphs of the management information respectively acquired from the plurality of certain management target apparatuses in an overlapped manner.
5. The management system according to claim 4,
wherein the microprocessor, in a case where the management information for which the threshold-reaching frequency is equal to or greater than the certain value is detected from among the management information that is respectively acquired from the plurality of certain management target apparatuses, is configured to notify an existence of this management information.
6. The management system according to claim 1,
wherein the microprocessor, in a case where a plurality of the management setting information are associated with one of the certain management target apparatuses, is configured to output information denoting these respective management setting information in accordance with a request.
7. The management system according to claim 6,
wherein the microprocessor, in a case where the respective management setting information which is associated with one of the certain management target apparatuses and comprises different thresholds of the same type, is configured to select a threshold having a highest likelihood of the certain alert being outputted from among the respective thresholds.

8. The management system according to claim 1, wherein the microprocessor is configured to create new management setting information based on a change instruction and the management setting information that is stored in the memory.

9. The management system according to claim 8, wherein the delivery added component information and the delivery management setting information are associated with each other at a delivery source beforehand.

10. The management system according to claim 1, wherein, for (1), the microprocessor is configured to receive delivery data as the delivery added component information and the delivery management setting information, and wherein the delivery data includes the added component information and the management setting information.

11. An information processing system comprising:
a plurality of management target apparatuses; and
a management system comprising one or more computers the management system configured to:
(1) receive delivery added component information and delivery management setting information;
(2) acquire, based on the delivery added component information, added component information which corresponds to a certain management target apparatus and describes either a procedure or a setting for acquiring management information from the certain management target apparatus;
(3) acquire, based on the delivery management setting information, management setting information which describes typical values of modifiable settings for monitoring the management information acquired by the added component information;
(4) use the added component information to acquire the management information from the certain management target apparatus and store the management information in a memory; and
(5) manage the certain management target apparatus based on the management information and the management setting information stored in the memory.

12. The information processing system according to claim 11, wherein the management setting information comprises a threshold for determining a status of the management information as at least one of the typical values of modifiable settings, further comprising the management system configured to:
in a case where the management information has reached the threshold, correspondingly output certain alert and identification information for identifying the management setting information related to the certain alert.

13. The information processing system according to claim 12, further comprising the management system configured to:
in a case where the management setting information is associated with a plurality of the certain management target apparatuses, output information denoting the plurality of the certain management target apparatuses when the threshold changes.

14. The information processing system according to claim 13, further comprising the management system configured to:
in a case where the threshold included in the management setting information changes, display the threshold and graphs of the management information respectively acquired from the plurality of certain management target apparatuses in an overlapped manner.

15. The information processing system according to claim 14, further comprising the management system configured to:
in a case where the management information for which the threshold-reaching frequency is equal to or greater than the certain value is detected from among the management information that is respectively acquired from the plurality of certain management target apparatuses, notify an existence of this management information.

16. The information processing system according to claim 11, further comprising the management system configured to:
in a case where a plurality of the management setting information are associated with one of the certain management target apparatuses, output information denoting these respective management setting information in accordance with a request.

17. The information processing system according to claim 16, further comprising the management system configured to:
in a case where the respective management setting information which is associated with one of the certain management target apparatuses and comprises different thresholds of the same type, select a threshold having a highest likelihood of the certain alert being outputted from among the respective thresholds.

18. The information processing system according to claim 12, further comprising the management system configured to:
create new management setting information based on a change instruction and the management setting information that is stored in the memory.

19. The information processing system according to claim 18, wherein the delivery added component information and the delivery management setting information are associated with each other at a delivery source beforehand.

20. The information processing system according to claim 11, further comprising the management system configured to:
receive delivery data as the delivery added component information and the delivery management setting information, wherein the delivery data includes the added component information and the management setting information.

21. A non-transitory computer readable medium having machine instructions stored therein, the instructions when executed by one or more processors, cause the one or more processors to perform operations comprising:
(1) receiving delivery added component information and delivery management setting information;
(2) acquiring, based on the delivery added component information, added component information which corresponds to a certain management target apparatus and describes either a procedure or a setting for acquiring management information from the certain management target apparatus;
(3) acquiring, based on the delivery management setting information, management setting information which describes typical values of modifiable settings for monitoring the management information acquired by the added component information;
(4) using the added component information to acquire the management information from the certain management target apparatus and storing the management information in a memory; and
(5) managing the certain management target apparatus based on the management information and the management setting information stored in the memory.

22. The non-transitory computer readable medium according to claim 21, wherein the management setting information comprises a threshold for determining a status of the management information as at least one of the typical values of modifiable settings, further comprising instructions in the non-transitory computer readable medium:

in a case where the management information has reached the threshold, for correspondingly outputting a certain alert and identification information for identifying the management setting information related to the certain alert.

23. The non-transitory computer readable medium according to claim 22, further comprising instructions in the non-transitory computer readable medium:

in a case where the management setting information is associated with a plurality of the certain management target apparatuses, for outputting information denoting the plurality of the certain management target apparatuses when the threshold changes.

24. The non-transitory computer readable medium according to claim 23, further comprising instructions in the non-transitory computer readable medium:

in a case where the threshold included in the management setting information changes, for displaying the threshold and graphs of the management information respectively acquired from the plurality of certain management target apparatuses in an overlapped manner.

25. The non-transitory computer readable medium according to claim 24, further comprising instructions in the non-transitory computer readable medium:

in a case where the management information for which the threshold-reaching frequency is equal to or greater than the certain value is detected from among the management information that is respectively acquired from the plurality of certain management target apparatuses, for notifying an existence of this management information.

26. The non-transitory computer readable medium according to claim 21, further comprising instructions in the non-transitory computer readable medium:

in a case where a plurality of the management setting information are associated with one of the certain management target apparatuses, for outputting information denoting these respective management setting information in accordance with a request.

27. The non-transitory computer readable medium according to claim 26, further comprising instructions in the non-transitory computer readable medium:

in a case where the respective management setting information which is associated with one of the certain management target apparatuses and comprises different thresholds of the same type, for selecting a threshold having a highest likelihood of the certain alert being outputted from among the respective thresholds.

28. The non-transitory computer readable medium according to claim 21, further comprising instructions in the non-transitory computer readable medium:

for creating new management setting information based on a change instruction and the management setting information that is stored in the memory.

29. The non-transitory computer readable medium according to claim 28, wherein the delivery added component information and the delivery management setting information are associated with each other at a delivery source beforehand.

30. The non-transitory computer readable medium according to claim 21, further comprising instructions in the non-transitory computer readable medium:

for receiving delivery data as the delivery added component information and the delivery management setting information, wherein the delivery data includes the added component information and the management setting information.

31. A distribution apparatus comprising:
a memory configured to store:
a distribution program;
delivery added component information; and
delivery management setting information, and a microprocessor configured to execute the distribution program to cause the distribution apparatus to send the delivery added component information and the delivery management setting information to a management system coupled to a plurality of management target apparatuses so that the management system:
(1) can respectively receive the delivery added component information for obtaining added component information to be stored in the memory, and the delivery management setting information for obtaining management setting information to be stored in the memory, and store the added component information and the management setting information in the memory using the delivery added component information and the delivery management setting information, wherein
the added component information corresponds to a certain management target apparatus and describes either a procedure or a setting for acquiring management information from the certain management target apparatus, and
the management setting information describes typical values of modifiable settings for monitoring the management information acquired by the added component information,
(2) can use the added component information stored in the memory to acquire the management information from the certain management target apparatus, and
(3) can manage the certain management target apparatus based on the acquired management information and the management setting information stored in the memory.

32. The distribution apparatus according to claim 31, wherein the management setting information comprises a threshold for determining a status of the management information as at least one of the typical values of modifiable settings, and
in a case where the management information has reached the threshold, the management system is configured to correspondingly output a certain alert and identification information for identifying the management setting information related to the certain alert, as a consequence of the sending of the delivery added component information and the delivery management setting information by the distribution apparatus.

33. The distribution apparatus according to claim 32, wherein the management system, in a case where the management setting information is associated with a plurality of the certain management target apparatuses, is configured to output information denoting the plurality of the certain management target apparatuses when the threshold changes, as a consequence of the sending of the delivery added component information and the delivery management setting information by the distribution apparatus.

34. The distribution apparatus according to claim 33, wherein the management system, in a case where the threshold included in the management setting information changes, is configured to display the threshold and graphs of the management information respectively acquired from the plurality of certain management target apparatuses in an overlapped manner, as a consequence of the sending of the delivery added component information and the delivery management setting information by the distribution apparatus.

35. The distribution apparatus according to claim 34, wherein the management system, in a case where the management information for which the threshold-reaching frequency is equal to or greater than the certain value is detected from among the management information that is respectively acquired from the plurality of certain management target apparatuses, is configured to notify an existence of this management information, as a consequence of the sending of the delivery added component information and the delivery management setting information by the distribution apparatus.

36. The distribution apparatus according to claim 31, wherein the management system, in a case where a plurality of the management setting information are associated with one of the certain management target apparatuses, is configured to output information denoting these respective management setting information in accordance with a request, as a consequence of the sending of the delivery added component information and the delivery management setting information by the distribution apparatus.

37. The distribution apparatus according to claim 36, wherein the management system, in a case where the respective management setting information which is associated with one of the certain management target apparatuses and comprises different thresholds of the same type, is configured to select a threshold having a highest likelihood of the certain alert being outputted from among the respective thresholds, as a consequence of the sending of the delivery added component information and the delivery management setting information by the distribution apparatus.

38. The distribution apparatus according to claim 31, wherein the management system is configured to create new management setting information based on a change instruction and the management setting information that is stored in the memory, as a consequence of the sending of the delivery added component information and the delivery management setting information by the distribution apparatus.

39. The distribution apparatus according to claim 38, wherein the delivery added component information and the delivery management setting information are associated with each other at a delivery source beforehand.

40. The distribution apparatus according to claim 31,
wherein, for (1), the management system is configured to receive delivery data as the delivery added component information and the delivery management setting information, as a consequence of the sending of the delivery added component information and the delivery management setting information by the distribution apparatus, and
wherein the delivery data includes the added component information and the management setting information.

* * * * *